United States Patent [19]

Osborn et al.

[11] 4,251,576
[45] Feb. 17, 1981

[54] INORGANIC REINFORCING PHASE DISPERSED AND BONDED TO POLYMER MATRIX

[75] Inventors: Peter G. Osborn, Bourne End; Desmond W. J. Osmond, Windsor; Barrie J. Thorpe, Stockport, all of England

[73] Assignee: Imperial Chemical Industries Limited, London, England

[21] Appl. No.: 118,326

[22] Filed: Feb. 4, 1980

Related U.S. Application Data

[63] Continuation of Ser. No. 871,406, Jan. 23, 1978, which is a continuation of Ser. No. 578,863, May 19, 1975, abandoned.

[30] Foreign Application Priority Data

May 29, 1974 [GB] United Kingdom ............... 23751/74
Oct. 18, 1974 [DE] Fed. Rep. of Germany ....... 2449656

[51] Int. Cl.$^3$ .................. B32B 5/16; B32B 15/08
[52] U.S. Cl. .................. 428/331; 260/42.14; 260/42.15; 260/42.16; 260/42.53; 428/36; 428/220; 428/310
[58] Field of Search ............. 260/42.53, 42.14, 42.15, 260/42.16; 428/36, 220, 310, 331

[56] References Cited

U.S. PATENT DOCUMENTS

| | | | |
|---|---|---|---|
| 2,433,992 | 11/1948 | Hughes | 260/42.57 |
| 2,751,369 | 6/1956 | Te Grotenhius | 260/42.57 |
| 3,133,893 | 5/1964 | Newman | 260/42.53 |
| 3,399,152 | 8/1968 | Jamrog et al. | 260/17 |
| 3,706,589 | 12/1972 | Fukuda et al. | 428/331 |
| 4,145,477 | 3/1979 | Smiley | 428/441 |

FOREIGN PATENT DOCUMENTS 1328136  8/1973  United Kingdom ................. 260/42.14

Primary Examiner—J. Ziegler
Attorney, Agent, or Firm—Cushman, Darby & Cushman

[57] ABSTRACT

Stable, fluid, mouldable and curable compositions are described from which may be fabricated composite materials, of improved mechanical properties, comprising an organic polymer matrix and a particulate inorganic reinforcing phase dispersed in and bonded to the matrix. The fluid compositions comprise (A) a polymerizable organic liquid having a viscosity not greater than 50 poise at the moulding temperature, (B) inorganic filler particles of defined size constituting at least 20% by volume, and optionally up to 90% by volume, of the total composition, and (C) a defined polymeric dispersant whereby the filler particles are stably dispersed in the polymerizable liquid. The generally low viscosity of the curable compositions enables them to be cast by simple techniques and polymerization of the component (A) yields the above-described composite materials.

11 Claims, No Drawings

INORGANIC REINFORCING PHASE DISPERSED AND BONDED TO POLYMER MATRIX

This is a continuation of application Ser. No. 871,406, filed Jan. 23, 1978 which is a continuation of Ser. No. 578,863, filed May 19, 1975, now abandoned.

This invention relates to novel curable compositions having improved fabrication characteristics, to a method of producing such compositions, and to the use of the compositions for making composite materials which under certain circumstances possess desirable combinations of stiffness, strength and toughness and may also possess other useful properties such as good abrasion resistance and resistance to fire. More particularly, the invention relates to stable fluid, curable compositions which comprise a dispersion of particles of one or more inorganic materials in a polymerisable organic liquid precursor, to a method of producing such compositions and to the production by curing thereof of multi-component composite materials which comprise an organic polymer matrix and a particulate inorganic reinforcing phase dispersed in, and bonded to, the matrix.

It is known to extend polymers by the incorporation of non-fibrous particulate fillers in order to cheapen them and/or to produce a stiffer material. Simple admixture of such a filler and a polymer usually results, however, in a very weak and brittle product. More recently, it has been demonstrated that stronger composite materials can be obtained if a strong bond is ensured between the polymer matrix and the filler particles. We have now found that by employing filler particles which are finely divided and are stably dispersed at high particle concentrations in a polymer matrix with the aid of a polymeric dispersant, it is possible to obtain composite materials of great utility which can be simultaneously stiffer, stronger and tougher than known composites. We have also found that the use of such a dispersant makes it possible to formulate highly fluid compositions comprising high concentrations of finely divided filler particles in polymerisable liquids, such compositions being capable of being cured to yield directly the improved composite materials referred to.

According to one aspect of the present invention there is provided a stable, fluid, mouldable and curable composition comprising (A) an organic liquid which is polymerisable to form a solid polymer and has a viscosity not greater than 50 poise at the temperature at which the composition is to be moulded, (B) finely divided particles as hereinafter defined of one or more inorganic fillers, the said particles constituting at least 20% by volume of the total composition, and (C) a polymeric dispersant as hereinafter defined whereby the filler particles are maintained in a state of stably deflocculated dispersion in the polymerisable liquid.

By "a polymerisable organic liquid", as component (A) of the composition, is meant herein one of the following classes of material:

(a) A liquid monomer, or a liquid mixture of monomers, which can be polymerized to form a solid polymer in which the repeat units in the polymer chain are linked through carbon-carbon bonds or by such bonds interrupted by hetero atoms such as oxygen, nitrogen or silicon. Preferably the polymerisation of the monomer or monomers takes place without the formation of any elimination product; in other words, preferred monomers are those which polymerise by bond rearrangement reactions. Such reactions may be of the following types:

(i) addition polymerisations of vinyl, vinylidene, or other similar unsaturated monomers, in the presence of conventional free radical initiators such as peroxides or azo compounds, or of conventional cationic or anionic initiators;

(ii) addition polymerisations of ring-opening cyclic monomers, using cationic or anionic initiators;

(iii) bond-rearrangement type condensation reactions, if desired in the presence of conventional catalysts.

Examples of such preferred liquid monomers of type (i) include the ethylenically unsaturated monomers such as the esters of acrylic and methacrylic acids with aliphatic, alicyclic or aromatic alcohols containing from 1 to 18 carbon atoms, for example methyl methacrylate, ethyl methacrylate, propyl methacrylate, butyl methacrylate, ethyl acrylate, butyl acrylate, 2-ethyl hexyl acrylate, ethylene glycol dimethacrylate, trimethylolpropane trimethacrylate, hydroxypropyl methacrylate, hydroxyethyl acrylate, dimethylaminoethyl methacrylate and diethylaminoethyl methacrylate; vinyl aromatic compounds such as styrene, vinyl toluene and divinylbenzene, and mixtures of these with maleic acid or fumaric acid derivatives such as chlorophenylmaleimide and butyl hydrogen maleate; allyl ethers and esters such as allyl diglycol dicarbonate; and other monomers of this class including acrylonitrile, methacrylonitrile, vinyl esters such as vinylacetate, vinyl ethers, vinyl chloride, vinylidene chloride and vinyl pyrrolidone.

Examples of preferred liquid monomers of type (ii) include cyclic ethers, in particular epoxides such as glycidyl ethers, e.g. alkyl and aryl glycidyl ethers, and glycidyl esters, such as "Cardura" E (Registered Trade Mark) which is the reaction product of epichlorohydrin and a mixture of branched $C_{9-11}$ monocarboxylic acids known as "Versatic" acid (Registered Trade Mark). Other examples include formals such as trioxane; lactones and cyclic esters such as $\beta$-propiolactone, $\epsilon$-caprolactone; lactams and cyclic amides such as $\epsilon$-caprolactam, lauryl lactam, pyrrolidone; cyclic siloxanes such as octamethyl cyclotetrasiloxane.

Further examples of the preferred class of liquid monomers includes the following pairs of co-reactants which polymerise by reactions of type (iii) referred to above: polyamines and polyisocyanates, polyols and polyisocyanates and polycarboxylic acids (or their anhydrides) and polyepoxides. Suitable polyamines include ethylene diamine, hexamethylene diamine, decamethylene diamine, diethylene triamine, piperazine, m- and p-xylylene diamine and m- and p-phenylene diamine. Suitable polyols include ethylene glycol, diethylene glycol, trimethylene glycol, tetramethylene glycol, hexamethylene glycol, tetramethyl ethylene glycol, neopentyl glycol, trimethylolpropane, glycerol, 1,2,6-hexanetriol, 1,3- and 1,4-cyclohexane diol and p-xylylene glycol. Suitable polyisocyanates include hexamethylene diisocyanate, 2,4- and 2,6-tolylene diisocyanate and 4,4'-diisocyanatodiphenyl methane. Suitable polycarboxylic acids or their anhydrides include succinic acid, adipic acid, phthalic anhydride, isophthalic acid, terephthalic acid, trimellitic acid, pyromellitic acid and 1,3- and 1,4-cyclohexane dicarboxylic acids. Suitable polyepoxides include the glycidyl ethers of 1,4-butane diol, glycerol, resorcinol and bisphenol A; bis-2,3-epoxy cyclopentyl ether.

(b) A mixture of one or more preformed polymers with one or more monomers, the monomer constituent(s) of which can be polymerised so that a solid polymer product results. The monomer or monomers may be the same as those described in (a) above, those which undergo a bond-rearrangement type of polymerisation being again preferred. The preformed polymer or polymers may be either in solution in the monomer constituent or in a state of dispersion therein; the polymer may be either the same as, or different from, the polymer which is produced by the polymerisation of the monomer constituent. Where the preformed polymer is soluble in the monomer constituent, it may be either compatible or incompatible with the polymer produced by the polymerisation of the monomer; it may also be capable of undergoing grafting by the monomer.

The preformed polymer or polymers may be produced by any polymerisation route and, for this purpose, it is of no consequence whether or not any by-products are formed during the polymerisation. Thus the polymers may be made by polymerisation in the melt or in solution, by suspension polymerisation or by aqueous or non-aqueous dispersion polymerisation techniques, and isolated by conventional methods. Where the preformed polymer is to be present in the polymerisable liquid in the form of dispersed colloidal particles which are insoluble in the liquid, these particles may be made by grinding bulk polymer to the requisite degree or, more conveniently, they may be produced directly by employing aqueous or non-aqueous dispersion polymerisation procedures. Aqueous dispersion polymerisation techniques are very fully described in the technical literature; non-aqueous polymerisation techniques are described, for example, in U.S. Pat. Nos. 941,305; 1,052,241; 1,122,397; 1,123,611; 1,143,404; 1,231,614.

By employing a preformed polymer which is incompatible with the polymer formed by curing the monomeric constituent of the polymerisable liquid, one finally obtains a composite material in which the polymer matrix is itself a modified, composite phase, generally having a continuous component consisting of the polymer formed during curing and a disperse component consisting of particles of the preformed polymer. In this way, for example, a glassy polymer matrix may be modified by the incorporation in it of preformed rubbery polymer particles. Alternatively, the rubber may be initially in a state of solution in the monomer and be caused to phase-separate as the polymerisation proceeds. Alternatively, it may be arranged that strong ionic bonding forces ae developed at the interface between the polymer phases. Such techniques are well-known in the polymer dispersion and composites art.

Examples of mixed polymer/monomer systems suitable for use in the invention include, (1) syrups of reactive polymers such as (i) unsaturated polyesters, vinyl or vinylidene group-terminated urethanes, hydroxyalkyl acrylic or methacrylic ester adducts of aminoplasts such as melamine-formaldehyde resins and acrylic or methacrylic acid adducts of epoxy resins, in each case in combination with and dissolved in one or more ethylenically unsaturated monomers; (ii) mixtures of polyhydroxylic polymers such as $\alpha,\omega$-hydroxylic polyethers, polyesters or polybutadienes with polyisocyanates; (iii) mixtures of polyepoxide-containing polymers, such as epoxidised polybutadienes and novolacs or oligomeric diglycidyl ethers of epichlorhydrin and bisphenol A, with polyamines or anhydrides;

(2) syrups of non-reactive polymers dissolved in monomers; those in which the polymer formed on curing is compatible with the preformed polymer include poly(methyl methacrylate)/methyl methacrylate, and poly(2,6-dimethylphenylene oxide)/styrene. Those in which the two polymers are incompatible include polyisoprene/acrylonitrile, poly-(butylacrylate)/methyl methacrylate and cellulose acetate butyrate/methyl methacrylate;

(3) dispersions of polymers in monomers in which they do not dissolve, such as a polybutadiene microgel, encapsulated with cross-linked poly(methyl methacrylate), in methyl methacrylate monomer, polyacrylonitrile in methyl methacrylate or butyl acrylate, cross-linked poly-(butyl acrylate) in acrylonitrile and polyvinyl chloride in methyl methacrylate.

(c) a partially polymerised material or a pre-polymer, which is capable of polymerising to completion by any of the known polymerisation mechanisms but preferably by a bond-rearrangement mechanism as referred to in (a) above. Such pre-polymers include low molecular weight unsaturated oligomers such as 1,2-unsaturated polybutadienes and vinyl-terminated polyesters; polyepoxides such as epoxidised novolacs and polybutadienes; and pre-polymers obtained by partially reacting materials which undergo step-polymerisation, i.e. those which only yield high molecular weight products at high degrees of conversion of monomer to polymer; examples of these materials are the pairs of co-reactants mentioned in (a) above which polymerise by reactions of type (iii).

The polymerisable liquid A, whether of class (a), (b) or (c), may be such as to produce on polymerisation either a crystalline polymer or an amorphous polymer, and in the case of the latter the polymer may be either glassy or rubbery, that is to say it may have a glass transition temperature which is either above or below the environmental temperature respectively. There may be incorporated in the polymers non-reactive plasticizers such are normally used with these polymers.

In defining that the polymerisable organic liquid should have a viscosity not greater than 50 poise at the temperature at which the curable composition of the invention is to be moulded, we have regard to the fact that this is the temperature at which the viscosity is of greatest practical significance for the fabrication of composite materials from the curable composition. If the viscosity at this temperature is too high, the ease with which the composition can be moulded will be diminished. However, it is permissible for a monomer to have a viscosity at room temperature above the range stated, if the moulding is carried out at an elevated temperature, since viscosity normally falls with increasing temperature. The temperatures at which moulding and curing respectively of the compositions are carried out will not necessarily coincide.

It is preferred that the viscosity of the polymerisable liquid should be not greater than 10 poise at the moulding temperature, and even more preferably it is not greater than 1 poise at that temperature.

The particulate inorganic filler (B) which is stably dispersed in the polymerisable organic liquid (A) according to the invention is characteristically a solid material having a high elastic shear modulus, namely a modulus of not less than 5 GN/m$^2$ and preferably not less than 10 GN/m$^2$. Alternatively, suitable solid materials may be defined as those having a Knoop hardness of greater than 100. Examples of suitable solids include a wide variety of minerals such as aluminas, forms of silica such as quartz, cristobalite and tridymite, kaolin and its calcination products, feldspar, kyanite, olivine, nepheline syenite, sillimanite, zircon, wollastonite, apatite, aragonite, calcite, magnesite, barytes, gypsum and other metal silicates, aluminates, aluminosilicates, phosphates, sulphates, carbonates, sulphides, carbides and oxides; metals, which may be either brittle or ductile, such as cast iron, zinc alloys, aluminium, bronze and steel; and artificial materials such as glasses, porcelain, slag ash and forms of carbon such as coke.

In stating that the particles of the inorganic filler are finely divided, we mean that the maximum size of any particle present is 100 microns and that at least 95% by number of the particles are of a size 10 microns or less. Preferably more than 99% by number of the particles are of a size 10 microns or less, and in general the nearer the number proportion of such particles approaches 100% the better, e.g. a proportion of 99.999% by number of a size 10 microns or less gives very satisfactory results. It is at the same time preferred that the maximum size of any particle present should be 75 microns, even more preferred that the maximum size should be 50 microns. The finely divided particles of inorganic filler, whilst conforming to the foregoing definition of particle size, are furthermore defined herein as having a surface area of from 30 $m^2/cc$ to 1 $m^2/cc$, preferably from 20 $m^2/cc$ to 2 $m^2/cc$, as determined by the B.E.T. nitrogen absorption method.

The particles of the inorganic filler may have broad or narrow size distributions and these may be either monomodal or polymodal within the stated size ranges. The particle size of the filler refers to the largest dimensions of the particles, which may vary from being granular to being plate-like, cylindrical or rod-like, or oblong in shape. It is preferred that the particles be generally granular in shape, as opposed to plate- or rod-like, since the stiffness of composite materials made from the curable compositions and the ease of fabrication of the latter into composite materials are optimised thereby. However, for special applications, particles with length-to-diameter or length-to-thickness ratios not greater than 25:1, for example certain particles of asbestos, wollastonite, silicon carbide or silicon nitride "whiskers", kaolin or aluminium or mica platelets, may be employed.

The particulate filler may consist of only one of the materials referred to above, or it may consist of a mixture of two or more such materials. The particles may be produced by precipitation or atomisation, or from bulk material by conventional grinding or milling techniques. This aspect of the invention is discussed in more detail below.

It is also preferred that the surfaces of the particles are at least free of loosely bound water, as achieved, for example, by heating them to 150° C. In some cases, such as those in which a silane interfacial bonding agent is used as described below, it may be advantageous to calcine the particles at temperatures above 400° C. It is important that the particles used are not contaminated by deliberately introduced low molecular weight surface-active materials such as the fatty acids or salts thereof with which fillers as sold commercially are commonly treated.

As already stated, the curable compositions contain at least 20% by volume of the stably dispersed particulate inorganic filler, and they may contain up to 90% by volume of that component. Preferred volume concentrations of filler, in order to achieve the most advantageous properties in the composite materials obtained by curing the fluid compositions, depend to some extent on the nature of the solid polymer which is produced in the curing process. Where the solid polymer is amorphous and glassy, or where it is crystalline, a preferred concentration of filler is from 35% to 85% by volume, more preferably from 50% to 80% by volume, based on the total curable composition. In cases where the filler particles become strongly bonded to the solid polymer, as described in detail below, such concentrations of filler can result in an appreciable increase not only in stiffness but also in strength of the composite materials obtained on curing as compared with the unmodified solid polymer, without significant loss of toughness. When the solid polymer is rubbery and the filler particles are again strongly bonded thereto, the preferred volume concentration of filler ranges from 20% to 50%, based on the total curable composition; the elongation to break and the tear strength properties of the cured composites are significantly better than those of the unmodified polymer, with only a moderate increase in its stiffness. Concentrations of filler above 50% by volume may, however, be useful in the case of rubbery polymers for application in suspension systems, as compression blocks for bridges or mounting blocks for machinery, or as sealing gaskets.

The polymeric dispersant (C) employed in the curable compositions is an emphipathic substance containing at least one chain-like component of molecular weight at least 500 which is solvated by the polymerisable organic liquid (A), in the sense that, if this component were an independent molecule, the polymerisable liquid would be significantly better than a theta-solvent for it; the nature of a theta-solvent is discussed in "Polymer Handbook" (Ed. Brandrup and Immergut, Interscience, 1966) and in "Principles of Polymer Chemistry", Chapters 12–14, (Flory: Cornell, 1953). More simply, the polymerisable liquid may be described as being a "good" solvent for the chain-like component. In addition, the dispersant contains one or more groupings which are capable of associating with, and effecting anchoring to, the particles of the inorganic filler (B).

Suitable polymeric dispersants may be divided into the following types, of which illustrative but not limiting examples are given in the accompanying table:

1. Simple polymer or copolymer chains solvatable by the polymerisable organic liquid and terminated by a single particle-anchoring group. These may be generally represented as Xn Y, where X denotes a monomer unit (not necessarily identical throughout the chain), n is the degree of polymerisation, and Y is a specific anchoring group. The anchoring group may be, for example, a carboxyl, amino sulphate or hydroxyl group, as discussed in more detail below, and may be derived either from a suitable (co)monomer unit or from a transfer agent present during formation of the polymer chain. The polymer chain will have a minimum molecular weight of 500; preferably its molecular weight is greater than 1500.

2. Random copolymers solvatable by the polymerisable liquid, in which the monomer units carry a plurality of particle-anchoring groups. These may be represented, for example, by—XXXYYXXXXY—, where X is a monomer unit conferring on the polymer chain solubility in the polymerisable liquid and Y is a monomer unit bearing a specific anchoring group as in category (1). The copolymer preferably has a molecular weight greater than 3000. The monomer units carrying the anchoring groups constitute from 1–20% by weight, preferably from 1.5–15% and more preferably from 2–10%, of the total copolymer.

3. Block copolymer, which may be either simple or multiple:

(i) Simple AB block copolymers, where A represents a polymer or copolymer chain solvatable by the polymerisable liquid and B represents a polymer chain which is not thus solvatable and thereby functions as a particle-anchoring group. The molecular weight of the A block should be greater than 500, preferably greater than 1500, and the weight ratio of the A block to the B block is preferably between 3:1 to 1:3.

(ii) Multiple block copolymers, e.g.—$A_m B_n A_o B_p$—, where A and B have the same significance as in (i) and the suffixes m, n, o, p—denote differing lengths of polymer chain in each sequence of the block. The molecular weight of each A block is preferably greater than 1,500 and that of each B block is preferably not less than 500. The weight ratio of A blocks to B blocks is preferably the same as in (i).

4. Graft copolymers. These may be of three types, represented by:

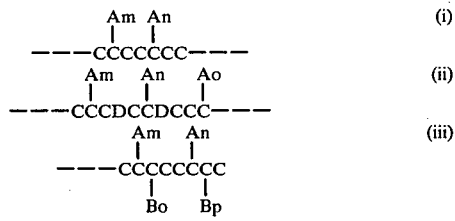

where A denotes a chain solvatable by the polymerisable liquid; and B denotes a chain non-solvatable by that liquid, the suffixes m, n, o, p—denoting differing lengths of the chains A and B; C is a monomer giving rise to a polymer backbone which in (i) is non-solvatable by the polymerisable liquid and in (ii) and (iii) may be either solvatable or non-solvatable by that liquid, and D is a monomer unit bearing a specific particle-anchoring group, similar to the monomer units Y in (2) above.

In these graft copolymers, the solvatable A chains have a minimum molecular weight of 500. The weight ratio of A chains to chains of C units in (i), or of A chains to chains of C and D units combined in (ii), is preferably between 3:1 and 1:3, more preferably as close as possible to 1:1. The D monomer units in (ii) should be present in the proportions indicated in (2) above in respect of the Y units. In (iii), the molecular weight of the B chains should be greater than 500; if the chains of C units are solvatable, the weight ratio of $(A+C):B$ should be from 3:1 to 1:3, whilst if the chains of C units are non-solvatable the weight ratio of $A:(B+C)$ should be from 3:1 to 1:3 and the weight ratio of B:C should also be within these limits, preferably about 1:1.

In selecting the polymeric dispersant to be used, it is important to avoid these amphipathic substances, particularly to types (2) and (4) above, with solvatable polymer chains containing several groupings capable of anchoring to the particulate filler which are so disposed that the substances are in fact flocculants, not dispersants. Polymeric dispersants are identified as those polymers which, when in their normal configuration at an interface between an inorganic particle and the polymerisable liquid, have a low concentration of anchor groupsings towards the outside of the sheath of polymer adsorbed on the particle, whereas flocculants characteristically have a substantial or high concentration of such groups on the outside of the sheath.

| TABLE OF POLYMERIC DISPERSANT TYPES | | | |
|---|---|---|---|
| Type | Stabilizing (solvatable) Chain | Anchor Group | Nature of Polymerisable Liquid |
| 1 | Poly(methyl methacrylate) | Terminal —COOH or metal carboxylate, —NH$_2$, SO$_4$H, OH | (Meth)acrylate monomer(s) or polymer-in-monomer syrup |
| | Polystyrene | Terminal —COOH or metal carboxylate, —NH$_2$, SO$_4$H, OH | Styrene (+ comonomers) |
| | t-Butyl benzoic acid/ phthalic anhydride/ propylene glycol polyester | Terminal —COOH | Unsaturated polyester of low or zero acid value; certain epoxy resins |
| | Epoxy resin, e.g. derived from diphenylol propane | Terminal aromatic ester, e.g. $-\overset{OH}{\underset{|}{C}}-CH_2O\,CO-\langle\bigcirc\rangle-NO_2$ | Epoxy resin |
| 2 | Poly(methyl methacrylate) | Dimethylaminoethyl methacrylate comonomer, or quaternary or acid salt thereof. | (Meth)acrylate monomer(s) |
| | ″ | Methacrylic acid comonomer, or metal salt thereof. | ″ |
| | Polystyrene | Dimethylaminoethyl methacrylate comonomer | Styrene (+ comonomers) |
| 3 | Polyisoprene | Poly(dimethylaminoethyl methacrylate) | (Meth)acrylate monomer(s) or styrene |
| | Poly(t-butylstyrene) | Poly(styrene-co-maleic anhydride) | Styrene (+ comonomers) |

TABLE OF POLYMERIC DISPERSANT TYPES (CONTINUED)

| Type | Stabilising (solvatable) Chain A | Backbone component B | Anchor component C | Nature of Polymerisable Liquid |
|---|---|---|---|---|
| 4(i) | Poly(methyl methacrylate) | Polyacrylonitrile | — | (Meth)acrylate monomer(s) |
|  | Polystyrene | Poly(methacrylic acid) | — | Styrene (+ comonomers) |
| 4(ii) | Polyester | Poly(styrene-co-maleic anhydride) reacted with laurylamine | | Unsaturated polyester |
|  | Poly(methyl) methacrylate) | Poly(methyl methacrylate-co-dimethylamino-ethyl methacrylate) | | (Meth)acrylate monomer(s) |
| 4(iii) | Poly(methyl methacrylate) | Poly(methyl methacrylate | Poly(methacrylic acid) | (Meth)acrylate monomer(s) |

The exact conditions and molecular types which achieve dispersion rather than flocculation will be recognized by those skilled in the art.

It is an essential feature of the invention that the solvated component of the polymeric dispersant, or a subsequent reaction product thereof obtained on curing the fluid composition, should remain solvated by, or be compatible with, the oligomeric or polymeric products which result throughout the course of the curing operation, so that flocculation or aggregation of the inorganic particles present is prevented and the dispersant becomes intimately incorporated or bound up in the matrix polymer of the cured composition. Whilst this requirement does not necessarily mean that any part of the dispersant molecule must be chemically the same as, or similar to, any preformed polymer or oligomeric constituent of the polymerisable liquid (A), or even the same as, or similar to, the solid polymer formed on curing, in practice such compatibility can be achieved simply by selecting the dispersant so that it has a solvated polymeric component which in composition is the same as, or closely related to, the final solid polymer. However, it may be arranged that the solvated polymer chains of the dispersant contain functional groupings through which grafting or copolymerisation with the monomers present in the polymerisable liquid (A) may take place during the curing operation. Grafting may be provided for, in the case of addition polymerisation of vinyl or vinylidene monomers, by incorporating in the dispersant molecule, for example, copolymerisable methacrylate groups in the manner described in British Pat. No. 1,052,241, or groups susceptible to hydrogen abstraction in the presence of active radicals obtained by decomposition of a peroxide. In the case where thermosetting polymers are produced on curing the polymerisable liquid, various chemically reactive groupings such as hydroxyl, amino, carboxylic acid, epoxy and methylol can be employed to achieve grafting or copolymerisation.

The solvated component of the polymeric dispersant should be of such a molecular weight and/or co-reactability that, when it becomes incorporated into the polymer matrix following curing of the composition, it does not have any deleterious effect on the mechanical properties of that polymer. If solvated components of molecular weight near the lower limit indicated for effective stabilisation are employed, it is preferred that the component in question should contain some polymerisable or other reactive grouping so that it can become chemically, as well as physically, incorporated into the polymer matrix.

It will accordingly be understood that the suitability of the solvatable component of a particular dispersant is dependent upon the choice of polymer matrix.

As already indicated, the particle-anchoring groupings which are present in the polymeric dispersants may broadly be of two types. The first type of groupings are those having some specific affinity for the surface of the inorganic particles, and these include polar groupings or chemically reactive groupings which are complementary to polar or reactive groupings present on the particle surface. These may be defined in more detail as follows:

(i) those groupings whereby some form of ionic bond with the inorganic particle is probably developed, for example carboxylic or sulphonic acid groups which can form salt-like bonds with metal ions or base-like centres in the particles, or amino or quaternary ammonium groups which can form such bonds with acidic centres in the particles;

(ii) those which probably lead to the formation of a covalent bond with the particles, e.g. isocyanate or alkoxysilane groups which can react with hydroxylic centres in the particles, or chromic chloride and other chelating agents which can react with chelatable centres in the particles;

(iii) those which probably lead to the formation of hydrogen bonds between the dispersant and the particle, such as carboxylic acid groups which can interact with hydroxyl groups in the particle;

(iv) those whereby some physical adsorption on to the particle surface takes place; for example through dipoledipole interactions or van der Waal forces; such groups include nitro, cyano, ester, amide and betaine groups, the weak interactions of which can be reinforced by attaching the groups in sequence to a relatively insoluble polymer chain. The second type of anchoring groupings are polymeric chains which, as compared with the solvated polymeric chains previously discussed, are relatively non-solvated by the polymerisable liquid (A) and each segment of which has at least a small, if non-specific, affinity for the inorganic particles. Examples of such groupings are poly(acrylic ester) or poly(methacrylic) ester chains where the carboxylic ester groups are responsible collectively for the anchoring function, or polystyrene chains where the aromatic rings perform that function.

There may be used, if desired, anchoring groupings of both the specific and the non-specific types mentioned above.

By way of further illustration, some polymeric dispersants which are suitable for use in specific situations will be described in more detail.

Examples of dispersants which are particularly suitable for use with addition polymers derived from one or more unsaturated monomers, or syrups of high molecular weight polymers dissolved in such monomers, are polymers of similar molecular type to the matrix polymer, having a molecular weight in the range 20,000-200,000, and having a number of groups distributed along the polymer chain which are substantive to the inorganic particle. Thus, for a syrup of a 90/10 $^w/_w$ copolymer of methyl methacrylate and butyl acrylate in methyl methacrylate, a suitable dispersant is a 95/5 $^w/_w$ copolymer of methyl methacrylate and methacrylic acid, or a metal salt of that acid. Other co-monomers which are polar and substantive to inorganic materials are also useful, e.g. dimethylaminoethyl methacrylate and quaternary ions or acid salts thereof, methacrylamide, γ-methacryloxypropyl trimethoxy silane, adducts of glycidyl methacrylate with polar-substituted aromatic acids such as a p-aminobenzoic acid, and adducts of glycidyl methacrylate with γ-aminopropyl trimethoxysilane.

Another form of dispersant which is useful is a copolymer consisting of solvated polymer chains which are attached at random intervals along a relatively insoluble polymer chain, the latter chain also having randomly attached thereto groups capable of effecting anchoring to the particles of inorganic filler. Such polymeric dispersants can be made, for example, by the methods described in British Pat. Nos. 1,052,241 and 1,122,397.

Examples of dispersants which are particularly suitable for use with polymer matrices obtained by polymerisation, chain-extension and cross-linking of unsaturated oligomers and their solutions in unsaturated monomers, are oligomers of a similar molecular weight which contain one or more similar unsaturated groups and one or more pendant polar groups. Thus a suitable dispersant for use in a solution in styrene of an epoxy resin which has been doubly terminally reacted with methacrylic acid to yield a divinyl-unsaturated polymer (such materials are sold under the trade name "Derakane"), is an oligomer which has been reacted at only one end with methacrylic acid to give a terminally unsaturated species and at the other end with p-aminobenzoic acid or with γ-aminopropyl trimethoxysilane to give a terminal grouping capable of adsorbing on to an inorganic particle surface, e.g. of silica.

Dispersants indicated as particularly suitable for one type of polymerisable liquid are not necessarily restricted to use with that type and are only illustrative of what is possible. Thus the above terminally unsaturated dispersant could be equally useful in a simple methyl methacrylate monomer-based composition.

A suitable dispersant for use in a polyurethane derived from a polyol and a polyisocyanate is obtained by grafting some of the polyol portion of the polymerisable liquid on to an acrylic polymer backbone which contains polar substituents. A suitable dispersant for use in an epoxy resin system can be obtained by reacting p-nitrobenzoic acid with some of the epoxy groups of the epoxy resin. For a system incorporating a vinylidene-terminated urethane, a dispersant can be made by reacting some of the urethane, through free NCO groups present therein, with γ-aminopropyl trimethoxysilane.

Although in the majority of cases the polymeric dispersant (C) will be a separately produced and incorporated constituent of the curable compositions of the invention, it is not essential that it be so, that is to say it is possible for some constituent of the polymerisable liquid (A) itself to perform the function of polymeric dispersant. Thus the terminal carboxylic acid groups of an unsaturated poly-ester chain can become adsorbed on to the inorganic particle surface. Monocarboxylic acid-terminated chains will act as a dispersant, but dicarboxylic acid chains may act as flocculants and it is preferred that these be avoided in order to make a non-flocculated dispersion. Polyesters which are essentially devoid of such dicarboxylic acid chains but contain significant amounts of monocarboxylic acid chains can be made by using excess diol to make a low acid value polyester and then further reducing the acid content by reaction with a monoepoxide, as outlined for example in British Pat. Nos. 1,045,199 and 1,317,605. Equally, it is possible for the dispersant to be formed in situ during the process of dispersing the filler in the polymerisable liquid, for example in consequence of there already being present a low molecular weight substance, containing a potential filler-anchoring group, which can combine with a solvated polymer chain. For example, epoxide-containing solvatable polymer chains can combine with the carboxyl group of a nitrobenzoic acid during the dispersion step.

The proportion of polymeric dispersant (C) used in the compositions of the invention is subject to wide variation depending on the nature of the associating groupings in the dispersant, the particulate inorganic material selected, the particle surface area and concentration, and the nature of the polymerisable liquid, but in general a satisfactory minimum proportion is 0.01 g/m$^2$ of the total particle surface area, as determined by the B.E.T. nitrogen absorption method. An adequate minimum proportion of polymeric dispersant is essential, in order to ensure that the inorganic particles are free from aggregation in the curable composition and remain so during the curing of the composition. In general, higher concentrations of polymeric dispersant are required when the inorganic particle concentration and total surface area are high, and also when the polymerisable liquid contains a soluble, preformed oligomer or polymer. Above a certain optimum level there is no further advantage to be gained in terms of particle stability by increasing the proportion of polymeric dispersant.

Where the curable compositions of the invention incorporate two or more types of finely divided particulate material, or where there is present, in addition to the particulate inorganic filler, a pigment as referred to below, it may be advantageous to employ two or more different polymeric dispersants. In these dispersants, the "anchoring" components may be differently selected according to the surface characteristics of the particles in question. The solvatable components of the dispersants may be either the same or different, but if different they must nevertheless be compatible with one another and with the other components of the curable composition, as previously discussed.

Although it is not essential in order to obtain certain of the benefits of the invention, it is a preferred feature of the curable compositions of the invention that, in addition to comprising the polymerisable organic liquid (A), the particulate inorganic filler (B) and the polymeric dispersant (C) already described, they should contain a substance providing active groupings whereby it may be ensured that the polymer matrix and the particles are very strongly bonded together in the final composite material obtained after curing. Some degree of bonding between the matrix and the particles is always present simply by virtue of the presence of the polymeric dispersant, the characteristics of which result in its becoming located at the interface between these two phases and exhibiting an affinity for them both. However, in order to obtain composite materials of optimum mechanical properties, it is necessary that the strength of the bond between the polymer matrix and the particles should be at least as great as the internal cohesive strength of whichever of these two constituents is the weaker.

In suitable cases, the required strong bond can be produced through the use of an appropriately selected polymeric dispersant, whereby the forces which associate the dispersant with the particles are sufficiently strong and the solvated component of the dispersant becomes fully integrated into the polymer matrix after curing either through chemical interaction or by virtue of its being a compatatible polymer of comparable molecular weight.

Preferably, however, the production of a very strong bond between the polymer matrix and the particles is achieved or assisted by the inclusion in the curable composition of a low molecular weight bonding agent of the type which contains one or more groups capable of interacting with groups in the inorganic material, and also one or more groups which can copolymerise with, or otherwise graft on to, the polymer forming the matrix in the finished composite material. In using a low molecular weight bonding agent of this type, care must be taken that the bonding agent is, like the polymeric dispersant, present at the interface between the two species to be bonded; this requires that the proportions of dispersant and bonding agent used should be controlled so that neither individually achieves saturated coverage of the particle surface, thus leaving no space for the other agent to become adsorbed.

The particular type of bonding agent to be used will depend upon the nature of the inorganic filler and of the polymerisable organic liquid. Suitable bonding agents are in general substances containing groups which can form a multiplicity of ionic, covalent or hydrogen bonds with the particle, and also groups which can react to form bonds with the polymer matrix. Suitable groups for bonding to particles having hydroxylic, metal oxide or silicaceous surfaces are, for example, the oligomeric hydrolysis products of alkoxy silanes, chlorosilanes and alkyl titanates as well as the trivalent chromium complexes of organic acids. Where the particle surface is of a basic character, as for example in the case of particles of alkaline earth metal carbonates or of metals such as aluminum, chromium and steel, suitable bonding groups are carboxylic acid groups. In the case of particles with acidic surfaces, such as those of kaolin, amine salt groups are suitable for bonding to the particles.

Groups suitable for bringing about bonding with the polymer matrix are typically those which co-react with the polymerisable liquid during the polymerisation stage. Thus an interfacial bonding agent containing an ethylenically unsaturated group is suitable for use with addition polymerisation systems involving vinyl, vinylidene and similar unsaturated monomers. An agent containing an amino, an oxirane or a carboxyl group is suitable for use with epoxy-group-containing compounds. Examples of suitable interfacial bonding agents include:

γ-methacryloxypropyl trimethoxy silane
γ-aminopropyl trimethoxysilane
γ-glycidyloxypropyl trimethoxysilane
vinyl triethoxysilane
vinyl triacetoxysilane
vinyl trichlorosilane
Acrylic and methacrylic acids and their metal salts
Methacrylatochromic chloride
Maleimidopropionic acid
Succinimidopropionic acid
4-Aminomethylpiperidine
Tetraisopropyl and tetrabutyl titanates The amounts of the interfacial bonding agent used are, in general, those conventional in the art of polymeric materials reinforced with inorganic fillers. A suitable minimum usage for most applications is about 0.001 g of bonding agent per square meter of filler particle surface area. If desired, a mixture of two or more interfacial bonding agents of the types described may be used.

The curable compositions of the invention may incorporate dyestuffs or pigments. These constituents may be dissolved or dispersed in the complete mixture of the polymerisable liquid, the finely divided inorganic filler and the polymeric dispersant, or, in the case of pigments, they may be added to that mixture as a preformed dispersion in the polymerisable liquid which has been prepared with the aid of a suitable pigment dispersant, for example a dispersant of the type described in U.S. Pat. No. 1,108,261 or in our co-pending Application Ser. No. 9494/71.

There may also be incorporated in the curable compositions coarse granular "filler" particles or coarse fibrous material which are dispersed, but not stably dispersed, in the other constituents. By "coarse" is here meant that the average diameter of the granules or the fibre strands is at least ten times greater than the average diameter of the finely divided inorganic filler particles as hereinbefore defined. Under these circumstances, the stable dispersion of finely divided particles behaves essentially as a fluid towards the coarse particles, that is to say the resistance to motion of the coarse particles through the dispersion is the same as it would be through a pure liquid of equivalent viscosity and density. In the composite materials obtained by subsequent curing, the polymer produced, together with the finely divided particles, constitutes essentially a binder of high mechanical quality for the coarse particulate material. Because there is no interaction between the coarse and the finely divided particles, there is no need to modify the proportion of the latter particles to the polymerisable organic liquid from that which would apply in the absence of the coarse material.

According to another aspect of the present invention there is provided a method for producing stable, fluid, mouldable and curable compositions as hereinbefore defined which comprises dispersing, in an organic liquid (A) which is polymerisable to form a solid polymer and which has a viscosity not greater than 50 poise at the temperature at which the composition is to be moulded, finely divided particles (B) as hereinbefore defined of an inorganic filler, in the presence of a polymeric dispersant (C) as hereinbefore defined, so that the filler particles constitute not less than 20% by volume of the total composition.

The polymerisable organic liquids, the inorganic fillers and the polymeric dispersants suitable for use in this method are those discussed above. It will be understood that the polymerisable liquid may optionally contain some preformed polymer, which may be either identical with or different from the polymer which is formed by the curing of the polymerisable liquid itself. It will also be understood that there may be present, in addition to the polymeric dispersant, an interfacial bonding agent as described above. The process of dispersing the particles of the inorganic filler in the polymerisable liquid may be carried out by any of the techniques commonly used in the paint industry for making dispersions of pigments in liquid vehicles, if desired at a temperature above room temperature. Thus, where the filler is already available in the required primary particle size, the process may conveniently be one of dispersing the particles in the polymerisable liquid, using techniques such as bead milling, pug milling or other methods whereby the dispersion is sheared and the particle aggregates thereby loosed and wetted out by the liquid. Alternatively, the finely divided particles may be produced directly in the presence of the polymerisable liquid, or in a liquid component thereof, and also in the presence of the polymeric dispersant, by comminution (fracturing) of coarse, non-colloidal particles. By such a technique, readily available raw materials, such as the coarse sands used in glass manufacture, can be utilised, the difficulties and hazards of handling fine powders (e.g. risks of explosion or of diseases such as silicosis) are avoided, and the degree of drying which is required following the normal process of manufacture in an aqueous medium is reduced. In addition, we have surprisingly found that the composite materials obtained by curing fluid compositions made by this particular method, where a low molecular weight bonding agent of the type previously discussed is also present during the comminution operation, have superior properties to those made from fluid compositions incorporating the same inorganic filler particles made by pre-grinding in aqueous media and then drying normally at 100° C. It is believed that these advantages are attributable to (1) the relatively low initial amounts of chemisorbed water which are introduced by using coarse inorganic particles, (2) the reduced likelihood of contamination of freshly created particle surfaces by water or other small molecules and the enhanced opportunity for strong adsorption by those surfaces of the polymeric dispersant and, if present, the interfacial bonding agent. If desired, however, comminution of the inorganic filler material may be carried out in some suitable non-aqueous liquid other than the polymerisable liquid, after which the liquid is removed by drying and the particles are then re-dispersed in the polymerisable liquid.

Comminution of coarse material, in the size range of one hundred to a few thousand microns, to yield smaller-size particles, is readily carried out by using conventional ball mills, stirred ball mills (attritors) or vibratory mills with preferably spherical or cylindrical grinding media which are harder and denser than the filler material, employing ratios of grinding media size to average initial particle size of about 10:1, or up to 100:1 where the polymerisable liquid is highly viscous. Multi-stage processing with different sized media, or the use of mixed media sizes and shapes, may be required to achieve very fine particle sizes or special particle size distributions.

Where the curable compositions are to incorporate an interfacial bonding agent, this may be introduced either during or after the process of re-dispersion of the inorganic particles in the polymerisable liquid, or their production by comminution, as the case may be. The bonding agent may simply be blended into the dispersion, but it is preferred to ensure in some way that the agent becomes associated with the inorganic particles. For example, where the bonding agent is a silane derivative as previously mentioned, it will be advantageous to arrange that sufficient water is present in, or is added to, the system to bring about complete hydrolysis of the silane derivative; this may be assisted by heating and the addition of a suitable catalyst, such as a n-alkylamine or a dialkyltin dicarboxylate.

Curable compositions according to the invention exhibit excellent stability on storage; any settlement is easily redispersed. In cases where it is desired to prevent settlement, this can be achieved by the addition of bentonite clays, fumed silicas, hydrogenated castor oil or other materials as is well-known in the paint and colloid arts.

According to a further aspect of the present invention, there is provided a process for the production of a multi-component composite material comprising an organic polymer matrix and a particulate inorganic reinforcing phase dispersed therein and bonded thereto, the process comprising subjecting to curing a curable fluid composition as hereinbefore defined so as to convert the polymerisable organic liquid component thereof into solid polymer.

This aspect of the invention includes the production of composite materials by curing mixture of two or more fluid compositions as hereinbefore defined.

It is a special feature of the invention, as already mentioned, that the curable compositions contain high volume loadings of the finely divided particulate inorganic filler and yet retain a very low viscosity. For example, in compositions containing 50 and 55 volume percent of finely divided granular particles, relative viscosities of only 10 times and 100 times that of the polymerisable liquid viscosity respectively are attainable. Such relative viscosities approximate closely to the minimum attainable for non-aggregated mono-dispersed spheres (cf. J. S. Chong, E. B. Christiansen and A. D. Baer, J. Applied Polym. Sci., Vol. 15, 2007–2021 (1971)).

Thus, for a monomer such as methyl methacrylate with a viscosity of 0.5 centipoise, filled dispersion viscosities of 5 centipoise for 50% by volume and 50 centipoise for 55% by volume are attained. In the case of a resin/monomer system with a viscosity of 5 poise, filled dispersion viscosities of only 50 and 500 poise, for 50% and 55% by volume respectively, are possible.

A further feature of the invention is the fact that the viscosity of the compositions is low even at very low shear rates, i.e. the compositions are Newtonian or near-Newtonian in character at low shear rates and do not have aggregated or flocculated filler-induced thixotropy (the compositions may, however, be somewhat thixotropic where an anti-settling agent such as bentonite has been included, as referred to above, or where the polymerisable liquid itself has a thixotropic character). Also because of the fine particle size, there is little tendency to settlement in the low viscosity media during the moulding and curing process, and no tendency to dilational cavitation when the compositions are sheared such as commonly leads to voiding with coarse slurries.

For most of the available techniques of fabricating the curable compositions, it is preferred that the composition should have a viscosity not greater than 1000 poise under the temperature and shear conditions under which the composition is to be moulded. However, for certain applications, viscosities higher than this limit may be acceptable. On the other hand, where low pressure moulding procedures are to be used, it may be desirable for the viscosity of the composition not to exceed 100 poise. In general, the adjustment of the various parameters such as the viscosity of the polymerisable liquid, the filler loading, the size distribution of the filler particles and the efficiency and amount used of the polymeric dispersant, in such a way as to obtain a curable composition of acceptable viscosity for any given fabrication technique, will readily be achieved by those skilled in the art.

These features render possible the fabrication of articles from the curable compositions by procedures which cannot be employed with previously known, fine particle-filled compositions, because of their high and often non-ideal viscosity.

The presence of the high proportion of inorganic material furthermore facilitates the casting of large objects directly from the curable fluid compositions at pressures at or only slightly above atmospheric; the heat of polymerisation generated by the polymerisable liquid during curing is absorbed and dissipated by the filler material. This factor substantially reduces the chance of void formation through boiling of monomer, and in cases where sufficient inorganic filler is present the chance of void formation can be completely eliminated, since the temperature rise during polymerisation will not exceed the monomer boiling temperature even if there is no heat loss to the mould, a condition which occurs in practice with thick section mouldings. However, in those cases where the "heat sink" capacity of the composition is not sufficient to prevent boiling, e.g. when a fast polymerisation is initiated at a temperature close to the monomer boiling point, void formation can be prevented by bringing about early gelation of the composition through the introduction of a cross-linking reaction into the curing process. In the case of a composition based on addition polymers, this may be achieved by the presence of polyfunctional species comprising part of the polymerisable liquid, such as ethylene glycol dimethacrylate where the polymerisable liquid is mainly based on methyl methacrylate. Alternatively, a separate gelation reaction may be introduced, such as the reaction of a polyisocyanate with oligomers containing a plurality of hydroxyl groups present in the polymerisable liquid, after which the cure is completed by a free radical-initiated addition polymerisation.

Curing of the compositions of the invention can, if desired, be carried out using closed moulds at greater than atmospheric pressure, and fast cures in the absence of any cross-linking reaction are then possible without boiling of monomer, but this involves expensive equipment and is not convenient with very large mouldings.

A number of methods can be used for fabricating articles from the curable compositions of the invention. They can be moulded simply by casting the mixture into moulds and initiating the polymerisation. Sheets, rods, beams and other convenient shapes can thus readily be obtained. Initiation may be induced by heat-activated catalysts, or by addition of catalysts immediately prior to moulding where curing at room temperature or lower temperatures is required. A preferred modification of the simple casting technique is to inject the curable, fluid composition under low pressure into closed, matched moulds; pressures of less than 10 p.s.i., are required for this process and hence cheap, light-weight moulds can be used and mouldings of very large surface area are practical, whereas much higher pressures are normally required for conventional filled compositions. A further variant of this technique is to fill the mould with fibre strands before injecting the dispersion into the mould so that it permeates through the fibre strand mesh ("resinjection"); again only low pressures are required and large surface-area mouldings are feasible. Whilst the injection of reactive resins into closed moulds filled with fibre strands is known, together with the associated advantages, e.g. the avoidance of the difficulties of moulding fibre/resin dispersions, better reproducibility than is possible with hand layup and the production of two good faces with the potentiality of moulding in bosses and ribs, it has not heretofore been practical as a process for highly filled compositions. The filled compositions known prior to this invention have either been of too high a viscosity or have contained coarse or aggregated particles which are filtered out by the fibre mesh; both of these effects create a high back pressure which prevents the mould from being filled. Many of the compositions of the present invention are, however, very low in viscosity and they also contain finely divided non-aggregated particles; they are, therefore, able to pass through and wet out the fibre mesh.

The fibres for use in this process can be either organic textile or inorganic (e.g. glass or metal), or a mixture of these. They are most conveniently introduced into the mould in mat form, although loose chopped strands and sprayed-up preforms, bound with a small amount of resin, can also be used. In general the fibre mesh should contain a major proportion of pores which are 5 times greater, preferably 10 times greater, in diameter than the average filler particle size. This condition is most readily attained for fibre volumes up to 40% by using fibre meshes made up of fibre strands of thicknesses which are at least 5 times, preferably at least 10 times, the filler particle size. Suitable fibre meshes of this type are commercially available; in the case of glass fibres, these are obtainable as multi-fibrillar strands containing from 20 to 1000 of 10 micron fibrils per strand. Meshes made up of fibres which have a diameter the same as, or less than, that of the particles can also be used, but only at lower fibre volumes.

Composite materials which contain fibres can also be made by conventional techniques such as hand layup and press-moulding of mixtures of the curable compositions and chopped fibre mixtures. Here again the low viscosity can be an advantage, leading to low moulding pressures and ease of wetting and de-aeration.

Composite sandwich mouldings can be made with advantage by the injection technique. Thus, one can totally encapsulate a core material which can be, for example, a low density foam, the combination of which with a skin of the high modulus, high strength composites of this invention produces light-weight, very stiff and strong structures. The core is placed in the mould which is then closed and the curable, fluid composition is injected around it. Fibre mats may also be placed in the mould along with the core; these serve to locate the core in the mould and subsequently to toughen the skins of the finished moulding. These techniques are generally described in our co-pending Application Ser. No. 10551/72.

Core encapsulation can also be carried out by spreading the fluid composition on either side of the core before placing it in a mould and then closing the mould so that excess liquid is squeezed out. Fibre mats can also be placed on either side before placing in the mould.

Another type of sandwich moulding is that in which the compositions of this invention are bonded during the curing operation to one side of a preshaped sheet or shell moulding. For example, a shell moulding is vacuum thermoformed from a plastic sheet, a matched mould is placed behind it so as to form a sealed cavity, the curable composition is injected into the cavity and then cured; in this way a composite article is obtained in which the cured composites material of this invention is bonded to one side of the plastic. By this means a thin plastic moulding can be rigidised and reinforced, whilst combining the simplicity of vacuum-forming of thermoplastics with the convenience and ease of the low pressure injection of the compositions of this invention.

The curable compositions of the invention can also be rotationally moulded to obtain complex hollow shapes and pipes; the fluid composition is placed in a mould and the mould is rotated on one or more axes, depending on the complexity of the article, whilst curing is effected. Again, because of the absence of any boiling of monomer, the ease of de-aeration and good flow characteristics of the fluid composition, flaw-free mouldings of large size can readily be made. Optionally fibres can also be introduced into the mould.

The cured mouldings as described above can, if desired, be further fabricated by machining and bonding. We have also surprisingly found that the cured composite materials of this invention can be thermoformed and are capable of large extensions without fracture at a temperature above the glass transition of the matrix polymer, where it is amorphous, or above its melting point where it is crystalline. Heated sheets can thus be formed into shapes by application of positive or negative pressure to the sheet to draw it into a mould. Conventional composite materials which contain coarse, poorly bonded, or aggregated particulate fillers usually whiten and fracture at low deformations and cannot normally be thermoformed in this way.

In all the above fabrication processes it is advantageous to use internal or external release agents, to prevent adhesion of the cured composite materials to the mould and to obtain a good surface finish. The techniques are well-known in the art. Examples of internal release aids include alkali or alkaline earth metal salts of fatty acids and alkyl phosphates and their neutralised derivatives. Suitable external release agents include poly(tetrafluoroethylene), silicone and polyvinyl alcohol coatings on the moulds.

Multi-component composite materials made according to the preferred embodiment of the invention, in which the polymer matrix and the inorganic particles are strongly bonded together, exhibit an unexpected and valuable combination of mechanical and physical properties, inasmuch as (contrary to accepted practice) not only the stiffness but also the strength continue to increase as the concentration of inorganic particulate phase is raised, right up to the maximum levels hereinbefore indicated. The impact strength of the matrix polymer is also largely retained and in certain cases enhanced. The cured composite materials have very good abrasion resistance if particles of a high Moh hardness, such as quartz and alumina, are used. They are also substantially more fire-resistant than unfilled polymers, and even when they burn their contribution to the total fire load is small and the flame size and rate of propagation is low. Compositions with an especially high resistance to fire may be obtained by using finely divided fillers which wholly or in part contain hydrated water which is released on heating, e.g. aluminium oxide trihydrate and calcium sulphate hemihydrate.

Products in which the composite materials incorporate coarse fibres, as hereinbefore described, are rendered significantly tougher. The use of a coarse, granular constituent makes it possible to produce a composite product having an inorganic content in excess of 95% w/w which, whilst being lower in strength than the unmodified matrix polymer, is significantly stronger and more abrasion-resistant than a conventional hydraulic cement.

As is evident from the range of mechanical properties and the potential fabrication processes hereinabove described, the composite materials of the invention are suitable for a very wide range of uses.

Articles which take advantage of the good surface finish, abrasion resistance, ease of pigmentation and fire resistance obtainable include work surfaces, decorative wall tiles, cabinet furniture, occasional tables and sanitary ware. Articles which utilize the high stiffness and strength of the composites and the ease of fabricating large, thin shell mouldings by the "resinjection" process are, for example, vehicle bodies, baths, boats and chair shells. Articles which can be made by rotational moulding include pipes, silos, vehicle bodies, toys and storage tanks.

The invention is illustrated but not limited by the following Examples, in which parts and percentages are by weight unless otherwise stated. The curable compositions are, except where otherwise stated, cast as approximately 5 mm-thick sheets; the flexural modulus and strength of the products are determined at 25° C. by three-point bending, the beam length being 10.16 cm and the rate of bend 5 mm/min. The impact strengths are all determined at 25° C. using the Charpy Impact Testing Machine as described in B.S. 2782: Part 3, Method 306D (1970). The abrasion resistance is determined by means of a Taber Abrader (Taber Instrument Corp.) using CS10 discs and a 1000 g load for 1000 cycles in each test. The sample is weighed before and after the test and the weight loss per 1000 cycles is recorded. The particle size distributions are determined by well-known Coulter counter techniques.

EXAMPLE 1

This Example illustrates the production of a fluid, curable composition from methyl methacrylate and quartz silica, using as polymeric dispersant an acrylic copolymer in which quaternary ammonium groupings effect anchoring to the surface of the particles.

A finely divided dry-ground and air-classified quartz silica (Minusil 5, ex Pensylvania Glass Sand Corporation) with a surface area as determined by nitrogen adsorption of 5.0 $m^2/g$ and a particle size distribution as follows:

Particles of 10 microns or less 99.999% by number (97.5% by weight).

Particles of 50 microns or less—(100.00% by weight) is dispersed in methyl methacrylate (containing 100 p.p.m of Topanol A* inhibitor) in the presence of 1.7% by weight based on the silica of a copolymer dispersant (methyl methacrylate 81.4 parts, ethyl acrylate 9.6 parts, dimethyl amino-ethyl methacrylate 4.8 parts, quaternised with benzyl chloride 4.2 parts) having $\overline{M}_w$ as determined by gel permeation chromatography (G.P.C.) 20,000, and in the presence also of 1.8% by weight based on the silica of γ-methacryloxypropyl trimethoxysilane, to give a very fluid, non-flocculated Particles of 10 microns or less 99.7% by number (55.0% by weight).

Particles of 50 microns or less—(100.0% by weight). The surface area of the sand after comminution is about 2 m²/g.; the surface area before comminution is less than 0.10 m²/g.

To 173.7 grams of the above dispersion is added 15.3 grams of methyl methacrylate and 1.18 grams of Perkadox Y16 initiator (2% by weight on total monomer). The dispersion is then cast and cured as described in Example 1. A glossy, flaw-free sheet containing 67% by weight (50% by volume) of silica is obtained; its mechanical properties are given in Table 1.

EXAMPLE 6

The comminution process described in Example 5 is repeated but omitting the silane derivative. A fluid dispersion of 73% by weight of colloidally fine silica in methyl methacrylate, having a similar viscosity and particle size range to the dispersion of Example 5 is obtained. To 173.3 g of this dispersion is added 15.3 g of methyl methacrylate and 1.18 g of Perkadox Y16 initiator. The dispersion is then cast and cured as described in Example 1. A glossy, flaw-free sheet containing 67% by weight (50% by volume) of silica is obtained, the mechanical properties of which are shown in Table I.

Comparative Example G

The comminution process described in Example 6 is repeated but omitting the copolymer stabiliser. A flocculated mixture which cannot be separated from the steatite grinding media is obtained.

EXAMPLE 7

To 173.7 g of the dispersion prepared as described in Example 6 is added 15.3 g of methyl methacrylate, 1.18 g of Perkadox Y16 initiator, and 0.19 g of γ-methacryloxypropyl trimethoxysilane (0.15% dry weight on the silica). The dispersion is allowed to stand for 24 hours, then cast and cured as described in Example 1 to produce a glossy, flaw-free sheet containing 50% by volume of silica and having mechanical properties as reported in Table I.

EXAMPLE 8

Example 7 is repeated except that the dispersion is heated in the presence of the silane derivative to 100° C. for 5 mins. and then cooled to room temperature before adding the initiator and curing. A glossy, flaw-free sheet containing 50% by volume of silica and having the mechanical properties reported in Table I is obtained.

EXAMPLE 9

Example 7 is repeated but with 0.050 g of n-propyl amine added. The mechanical properties of the cured product are reported in Table I.

EXAMPLE 10

1560 Grams of the coarse silica sand described in Example 5, 600 g of distilled water and 1.2 g of sodium hydroxide are charged to a 1 gallon ball mill along with 5,300 g of ⅜" steatite balls. The ball mill is rotated for 24 hours as in Example 5 and when the balls are separated from the charge a fluid dispersion of fine silica sand in water is obtained. This silica has a particle size after comminution similar to that recorded in Example 5. The dispersion is then treated with 0.15% by weight of the sand of γ-methacryloxypropyl trimethoxysilane as a 5% solution in water, the pH of which has been adjusted to 3.5 with acetic acid. The dispersion is air-dried overnight and then dried in an oven at 185° C. for 2 hours. To 312 g of the dry silane-treated silica so obtained is then added 149 g of methyl methacrylate monomer and 2.8 g of the copolymer dispersant described in Example 5. The dispersion is sheared for 1 hour to redisperse the particles and a fluid, stable dispersion is obtained. This dispersion is then initiated, cast and cured as described in Example 1 to give a flaw-free sheet containing 50% by volume of silica and having the mechanical properties reported in Table I.

EXAMPLE 11

Example 5 is repeated but using 4.5 g of γ-aminopropyltrimethoxysilane instead of the γ-methacryloxypropyl trimethoxysilane.

TABLE I

| | Type of composition | Flex. mod., GN m⁻² | Flex. Strength, MN m⁻² | Charpy impact strength, KJ m⁻² |
|---|---|---|---|---|
| Ex. 5 | Silane derivative added before comminution. | 12.5 | 114 ± 6 | 6.8 |
| Ex. 6 | No silane derivative. | 12.0 | 60 ± 3 | 2.5 |
| Ex. 7 | Silane derivative added after comminution. | 12.0 | 78 ± 5 | 3.9 |
| Ex. 8 | Silane derivative added after comminution, with subsequent heating. | 13.0 | 120 ± 4 | 6.4 |
| Ex. 9 | Silane derivative added after comminution with n-propylamine catalyst. | 13.0 | 120 ± 9 | 6.3 |
| Ex. 10 | Sand comminuted in water, treated with silane derivative, dried then redispersed in monomer. | 12.0 | 73 ± 4 | 3.7 |
| Ex. 11 | Different silane derivative used from that of Examples 5–10. | 13.0 | 74 | 1.8 |
| Comparative Ex. F | Unfilled polymer matrix. | 3 | 100 | 6–8 | the efficacy of adding the interfacial bonding agent during the comminution step along with the polymeric dispersant, as compared with merely adding it after comminution (Example 7) or pretreating the aqueous-comminuted silica (Example 10). Examples 8 and 9 illustrate the advantages of heat and catalytic treatment to promote utilisation of the interfacial bonding agent. The relatively poor properties of the product of Example 11 illustrate the importance of selecting an interfacial bonding agent which can react with the polymer matrix; Example 6 shows that omission of added bonding agent leads to a similar result.

Comparative Examples H–I

This pair of Examples illustrates the importance of using finely divided particles of the inorganic filler.

dispersion (Ford No. 4 cup viscosity at 20° C. less than 15 secs.). The dispersion contains 67% by weight of silica.

*"Topanol" A is a Registered Trade Mark of Imperial Chemical Industries Limited for 2,4-dimethyl-6-tert-butyl phenol.

100 parts by weight of this dispersion is heated to 100° C. and then cooled to room temperature, 0.6 part by weight of Perkadox Y16 is added (2% by weight on the monomer). The initiated dispersion is cast in a flat plate mould lined with Melinex* film and heated for 2 hours at 50° C. and 2 hours at 80° C. The finished casting is very glossy and flawless, contains 50% by volume of silica and has a flexural modulus of 12.6 GN $m^{-2}$, flexural strength 110 MN $m^{-2}$ and Charpy unnotched impact strength of 6.0 KJ $m^{-2}$.

** "Perkadox" Y16 is a Registered Trade Mark of AKZONovadel for bis(4-tert-butylcyclohexyl) peroxydicarbonate.
*** "Melinex" is a Registered Trade Mark of Imperial Chemical Industries Limited for an biaxially orientated poly(ethylene terephthalate) sheet.
* "Topanol" A is a Registered Trade Mark of Imperial Chemical Industries Limited for 2,4-dimethyl-6-tert-butyl, phenol.

EXAMPLE 2

Example 1 is repeated but with an increased level of silica. Thus by using the same ingredients as before but less methyl methacrylate a 69% by weight dispersion is made which has a Ford No. 4 cup viscosity at 20° C. of 19 secs. It is cured as described in Example 1 and gives a flaw-free, glossy sheet, with a silica volume of 52.5%, a flexural modulus of 12.4 GN $m^{-2}$ and a flexural strength of 110 MN $m^{-2}$.

EXAMPLE 3

Example 2 is repeated but omitting the silane derivative. A fluid dispersion is obtained having a Ford No. 4 cup viscosity at 20° C. of 16 secs. When cured as described in Example 1 a flaw-free glossy sheet with a silica volume of 52.5% is obtained which is somewhat weaker and more brittle than that obtained in Example 2.

EXAMPLE 4

In this Example, the polymeric dispersant of Examples 1-3 is replaced by a different acrylic copolymer in which carboxylic acid groups are present to effect anchoring to the silica particles.

Example 1 is repeated except that the dispersant used in that Example is replaced by 3.4 parts by weight based on the silica of a copolymer dispersant (methyl methacrylate 98 parts methacrylic acid 2 parts), having $\bar{M}_w$ (G.P.C.) 110,000. A fluid dispersion is obtained. The finished casting is glossy and flaw-free and has a flexural modulus of 10.4 GN $m^{-2}$, a flexural strength of 127 MN $m^{-2}$ and a Charpy impact strength of 6.5 KJ $m^{-2}$.

Comparative Examples A–F

To illustrate the importance of having present a polymeric dispersant, the attempted preparation is shown of a number of compositions using the same quartz silica in the same concentration as before, but either omitting the polymeric dispersant altogether or replacing it by a conventional dispersing agent.

Comparative Example A

The quartz silica as described in Example 1, (67 parts by weight) is sheared into 33% by weight of methyl methacrylate. A powdery cake is obtained having no fluidity at all.

Comparative Example B

The quartz silica as described in Example 1 (67% by weight) is sheared into a mixture of 31.2% by weight of methyl methacrylate and 1.14% by weight of γ-methacryloxypropyl trimethoxysilane. (1.7% by weight on silica). A very thick, flocculated mixture is obtained, which cannot be cast. It is pressed into a mould and cured as described in Example 1 to give a cracked and flawed sheet.

Comparative Example C

The quartz silica as described in Example 1 (67% by weight) is sheared into a mixture of 30 parts of methyl methacrylate, 1.14% by weight of γ-methacryloxypropyl trimethoxysilane and 1.2% by weight of sodium stearate. A thick flocculated mixture is produced which cannot be cast and which when pressed into a mould and cured as in Example 1 produces a cracked and flawed casting.

Comparative Example D

Comparative Example C is repeated, replacing the sodium stearate with a nonyl phenol/ethyleneoxide condensate.

A flocculated mix and a cracked and flawed casting result.

Comparative Example E

Comparative Example C is repeated, replacing the sodium stearate with cetyl pyridinium bromide.

A flocculated mix and a cracked and flawed casting result.

Comparative Example F

To illustrate the improved mechanical properties of the filled compositions described in Examples 1–4, as compared with the properties of the matrix polymer, the methyl methacrylate used in Example 1 is polymerised under the same conditions as are described in that Example. The polymer obtained has a flexural modulus of 3.0 GN $m^{-2}$, a flexural strength of 100 MN $m^{-2}$ and an impact strength of 6-8 KJ $m^{-2}$.

EXAMPLES 5–11

In this series of Examples dispersions of finely divided α-quartz silica are made by comminution (fracturing) of coarse silica glass sand in the monomer.

EXAMPLE 5

312 Grams of coarse glass-making quartz sand (Harrison Meyer 44431), 80–86% by weight of which has a particle size lying between 150 and 420 microns, 133 grams of methyl methacrylate, 0.45 grams (0.15% by weight on silica) of γ-methylacryloxypropyl trimethoxysilane and 2.8 grams of copolymer dispersant (98:2 methyl methacrylate/methacrylic acid copolymer of $\bar{M}_w$ 110,000 (G.P.C.)) are charged together with 1,050 grams of ⅜" steatite balls to a two gallon ballmill. The ratio of the charge to voids between the balls is 1/1. The mill is rotated at 60 r.p.m. for 24 hours. After separating the balls, a dispersion consisting of 73% by weight of finely divided quartz silica in the monomer is obtained which has a Ford No. 4 cup viscosity of 58 secs. at 20° C. and a viscosity of 0.4 poise at a shear rate of 20 sec. $^{-1}$ and 25° C. The particle size distribution of the quartz so obtained is as follows:

Comparative Example H

The coarse silica sand (average particle size 250 microns) of Example 5 is admixed with the methyl methacrylate, silane derivative and polymeric stabiliser described in that Example to give a slurry containing 67% by weight of silica which settles too rapidly for casting to be possible. In order to obtain a sample for comparison, the sand is slurried in a syrup of 7.8 parts of poly(methyl methacrylate) and 51.2 parts of methyl methacrylate, together with the silane derivative and polymeric dispersant described in Example 5. The syrupy slurry so obtained is heated to 100° C. for 5 mins., cooled and then initiated and cast as described in Example 1. The mould is rotated during curing to prevent settlement. The casting so obtained has a rough surface due to the presence of the coarse particles of silica. The mechanical properties of the product are reported in Table II.

COMPARATIVE EXAMPLE I

A ball mill is charged with coarse sand, monomer and other ingredients as described in Example 5, but the mixture is comminuted for 2 hours only instead of for 24 hours. A slurry which has particles with the following distribution of sizes is obtained:

Particles of 10 microns or less 98% by number (7% by weight).
Particles of 50 microns or less—(29% by weight).
Particles of 100 microns or less—(55% by weight).
Particles of 250 microns or less—(96% by weight).

The surface area of the particles as determined by nitrogen adsorption is 0.16 m²/g. Since the slurry settles too rapidly for direct casting, poly(methyl methacrylate) is added and methyl methacrylate monomer evaporated off to make a handleable syrup, in which the polymer to monomer ratio by weight is 1 to 6.6. The syrupy slurry is then heated to 100° for 5 minutes, cooled, initiated, cast as in Example 1 and cured in a rotating mould to prevent settlement. The finished sheet has a rough surface due to the presence of the coarse sand particles. The mechanical properties of the product are reported in Table II.

TABLE II

| | Particle size (% by weight) | Flex Modulus, $GN\ m^{-2}$ | Flex strength, $MN\ m^{-2}$ | Impact strength, $KJ\ m^{-2}$ |
|---|---|---|---|---|
| Example 8 | 55% ≦ 10 microns<br>100% ≦ 30 microns | 13.0 | 120 | 6.3 |
| Comparative Example I | 55% ≦ 100 microns<br>96% ≦ 250 microns | 10.9 | 71 | 3.2 |
| Comparative Example H | 50% ≦ 200 microns<br>99% ≦ 450 microns | 9.7 | 37 | 2.4 |

The above compositions illustrate that, in addition to the problems of manipulating coarse particle slurries, markedly inferior mechanical properties result from the use of coarse particles, as compared with the properties of products of the invention as exemplified by Example 8.

EXAMPLES 12, 13 and 14

The procedure of Example 5 is repeated except that the concentration of silane derivative is increased to 1.5% by weight on silica. Before curing, the methyl methacrylate concentration is adjusted so that the final silica concentrations in the cured castings are 50%, 55% and 60% by volume (67%, 72% and 78% by weight) respectively. The mechanical properties of the cured products are reported in Table III.

TABLE III

| Example | % vol. silica | Flex. Mod. $GN\ m^{-2}$ | Flex. Strength, $MN\ m^{-2}$ | Impact Strength, $KJ\ m^{-2}$ | Taber abrasion; weight removed in mg/1000 cycles at 1000g weight. |
|---|---|---|---|---|---|
| 12 | 50 | 12 | 128 | 6.3 | — |
| 13 | 56 | 14.8 | 135 | 6.1 | — |
| 14 | 60 | 15.3 | 150 | 6.1 | 13 |
| Comparative Example F | 0 | 3 | 100 | 6–8 | 99 |

The above results illustrate how the mechanical properties of the cured composites continue to increase as the particle volume increases. Furthermore, the abrasion results indicate a 7-fold improvement over the base polymer.

Comparative Example J

An attempt to produce a composite material according to the procedure described in Examples 12–14 at a 60% volume fraction of silica, employing the silane derivative but omitting the polymeric dispersant, results in a cracked and flawed casting.

EXAMPLE 15

Following a similar comminution procedure to that of Example 5, 2726.50 g of coarse β-cristobalite silica sand, average size 200 microns, 903.85 g of methyl methacrylate (containing 100 p.p.m. Topanol A), 7.81 g of γ-methacryloxypropyl trimethoxy silane and 57.89 g of a 98:2 methyl methacrylate/methacrylic acid copolymer dispersant are charged to a 2 gallon ball mill with 9,700 g of steatite balls. The mill is rotated for 20 hours at 60 r.p.m. and then 254.32 g of rutile titanium dioxide pigment is added. The mill is rotated for a further 4 hours, then the dispersion is separated from the balls. The fluid dispersion contains 77.8% by weight cristobalite silica and pigment particles; the particle size distribution after comminution is:

Particles of 10 microns or less 99% by number (70% weight).
Particles of 50 microns or less—(99% by weight).
Particles of 75 microns or less—(100% by weight).

To 309 parts of the dispersion is added 1.18 parts Perkadox Y16 initiator and then 9.64 parts of methyl methacrylate is evaporated. The dispersion is cast in to a stainless steel sheet mould which is coated with a release agent, and then cured as described in Example 1. A glossy, flaw-free sheet containing 64% by volume (81% by weight) of silica and rutile particles is obtained. The mechanical properties of the product are:

Flexural modulus, 16.60 GN $m^{-2}$; Flexural strength 139.7 MN $m^{-2}$; impact strength 4.9 KJ $m^{-2}$.

EXAMPLES 16–17

In these examples, the dispersion of the inorganic filler in the polymerisable liquid is stabilised by the formation "in situ" of the calcium salts of an acidic copolymer dispersant.

EXAMPLE 16

A mixture of 1333.5 g of coarse β-cristobalite sand, as described in Example 15, 3.82 g of γ-methacrylyloxypropyltrimethoxysilane, 120 g of rutile titanium dioxide, 14.15 g of a 25:1 molar ratio copolymer of methyl methacrylate and methacrylic acid, 0.36 g (1 molar equivalent on acid present in copolymer dispersant), of calcium oxide, 556.7 g of methyl methacrylate (containing 100 p.p.m. Topanol A) is charged to a 1 gallon ball mill together with 5,200 g of steatite balls and the mill is rotated for 24 hours to yield a dispersion containing 73% by weight of particles having a particle size distribution similar to that of Example 5. The dispersion has a Brookfield viscosity at 2 r.p.m. and 20° C. of 0.8 poise. A similar dispersion made without the calcium oxide has a viscosity of 33 poise at 2 r.p.m. To 280 parts of the first-described dispersion is added 24 parts of methyl methacrylate and 2.0 parts of Perkadox Y16 initiator; at this stage the Brookfield viscosity is 0.2 poise. The dispersion is cast and cured as described in Example 1, to yield a glossy sheet containing 50% by volume of silica and rutile and having the following mechanical properties:

Flexural modulus, 10.55 GN m$^{-2}$; Flexural strength, 113 MN m$^{-2}$; Impact strength, 5 KJ m$^{-2}$.

EXAMPLE 17

To 280 parts of the ball-milled dispersion described in Example 15 is added 22.32 parts of a 45% by weight solution of a 90:10 weight ratio methyl methacrylate/butyl acrylate copolymer in methyl methacrylate monomer, and a further 1.78 parts of methyl methacrylate monomer together with 1.8 parts of Perkadox Y16 initiator. At this stage the Brookfield viscosity of the dispersion is 53 poise at 20 r.p.m. and 20° C.

The dispersion is cast and cured as described in Example 1 to yield a glossy sheet containing 50% by volume of silica and rutile, and having mechanical properties as follows:

Flexural modulus, 10.80 GN m$^{-2}$; Flexural strength, 112 MN m$^{-2}$; Impact strength, 5 KJ m$^{-2}$.

EXAMPLE 18

The following are charged to a 25 gallon ball mill containing 60% by volume of ⅜" steatite balls:

| | |
|---|---|
| Coarse cristobalite sand (as described in Example 15) | 2609 parts |
| Methyl methacrylate (containing 100 p.p.m. Topanol A) | 1045 parts |
| 95:5 weight ratio copolymer of methyl methacrylate and dimethylaminoethyl methacrylate, $\bar{M}_w$ 50,000 (G.P.C.) | 26.3 parts |
| γ-methacryloxypropyl trimethoxysilane | 7.1 parts |
| distilled water | 1.5 parts |

The ratio of the volume of the charge to voids between the balls is 1/1.

The mill is rotated at 60 r.p.m. for 6½ hours, a dispersion being obtained in greater than 98% yield having a cristobalite particle size distribution similar to that of Example 5. It contains 70% by weight (50 % by volume) of finely divided cristobalite and has a Brookfield viscosity at 2 r.p.m. and 20° C. of 0.05 poise. Evaporation of some of the methyl methacrylate gives a 78% by weight (55.6% by volume) dispersion having a viscosity of 0.40 poise.

To the 70% weight solids dispersion is added as internal release agent 0.15% by weight on the dispersion of an alkanolamine-neutralised fatty acid phosphate known commercially as Zelec NE (du Pont) and 2% by weight on the methyl methacrylate of Perkadox Y16. The dispersion is cast in a glass plate mould and cured as described in Example 1. A glossy, flaw-free sheet containing 54% by volume of silica is obtained, having the following mechanical properties:

Flexural modulus, 12.1 GN m$^{-2}$; Flexural strength, 140 MN m$^{-2}$; Impact strength, 8.0 KJ m$^{-2}$.

EXAMPLE 19

To a quart mill is charged the following:

| | |
|---|---|
| Coarse tunnel-calcined kaolin, average particle size 200 microns ('Molochite' 60-80)* | 324 g |
| methyl methacrylate (100 p.p.m. Topanol A) | 113 g |
| γ-methacryloxypropyl trimethoxysilane | 0.46 g |
| 98:2 - copolymer of methyl methacrylate and methacrylic acid, $\bar{M}_w$ 100,000 (G.P.C.). | 2.8 g |
| ⅜" steatite balls | 1,050 g |

*'Molochite' is a Registered Trade Mark of English China Clay Limited for a mixture of 56% mullite and 44% amorphous silica.

The mill is rotated for 24 hours at 90 r.p.m. to give a fluid dispersion containing 76.3% by weight of finely divided calcined kaolin. The final particles size distribution of the dispersion is:

Particles of 10 microns or less 99.5% by number (70% by weight).

Particles of 50 microns or less—(93% by weight).

Particles of 75 microns or less—(97.5% by weight).

Particles of 100 microns or less—(100.0% by weight).

The dispersion is diluted with further methyl methacrylate, initiated, cast and cured as described in Example 1 to yield a flaw-free sheet containing 50% by volume of inorganic particles and having the following mechanical properties:

Flexural modulus, 13.6 GN m$^{-2}$; Flexural strength, 130 MN m$^{-2}$; Impact strength, 6.6 KJ m$^{-2}$.

EXAMPLE 20

To a 1 gallon ball mill is charged the following:

| | |
|---|---|
| Coarse alumina trihydrate (80% > BS sieve 300; combined water 34% by weight, free water 0% by weight) | 1452 g |
| γ-methacryloxypropyl trimethoxysilane | 3.8 g |
| dispersant copolymer as described in Example 19 | 14.16 g |
| methyl methacrylate (100 p.p.m. Topanol A) | 556.84 g |
| ⅜" steatite balls | 5200 g |

The mill is rotated for 10 hours at 60 r.p.m., to yield a finely divided low viscosity dispersion containing 72% by weight of alumina trihydrate in methyl methacrylate. The dispersion is initiated, cast and cured as described in Example 1 to yield a glossy, flaw-free sheet with the following mechanical properties:

Flexural modulus, 13.8 GN m$^{-2}$; Flexural strength, 80.7 MN m$^{-2}$; The sheet does not catch fire when place in contact with a bunsen burner flame for one minute.

EXAMPLE 21

The procedure of Example 5 is repeated, but with the following reactants charged to the mill:

Coarse β-cristobalite sand as described in

-continued

| | |
|---|---|
| Example 15 | 2478.6 g |
| Rutile titanium dioxide pigment | 223.00 g |
| Methyl methacrylate (100 p.p.m. Topanol A) | 1045 g |
| γ-methacryloxypropyl trimethoxy silane | 7.1 g |
| Dispersant copolymer as described in Example 19 | 26.3 g |
| ⅜" steatite balls | 9,700 g |

After rotating the mill for 24 hours, a dispersion of 73.5% by weight of cristobalite and rutile in methyl methacrylate is obtained, having a Brookfield viscosity of 3.5 poise at 20° C. and 20 r.p.m. The particle size distribution of the dispersion is as follows:

Particles of 10 microns or less 99.7% by number (80.0% by weight).
Particles of 50 microns or less—(95.5% by weight).
Particles of 75 microns or less—(100.0% by weight).
After diluting the dispersion with further monomer to a Brookfield viscosity of 0.4 poise at 20 r.p.m. and 20° C., and initiating and curing as described in Example 1, a sheet containing 50% by volume of cristobalite and rutile is obtained. The mechanical properties are:

Flexural modulus, 10.6 GN m$^{-2}$; Flexural strength, 118.9 MN m$^{-2}$; Impact strength, 5.9 KJ m$^{-2}$.

EXAMPLE 22

The dispersions described in Examples 20 and 21 are mixed in the weight proportions of 2:1 respectively, then initiated and cured as described in Example 1. The cured casting has the following mechanical properties:

Flexural modulus, 12.4 GN m$^{-2}$; Flexural strength, 102 MN m$^{-2}$. When one end of a 4 inch long by ⅛" wide rod of the composition is held horizontally in contact with a bunsen burner flame for 1 minute, the composition ignites and burns with a small blue flame which extinguishes itself in a few seconds.

EXAMPLE 23

To 1600 parts of the ball-milled dispersion of Example 21 are added 43 parts of polyvinyl chloride particles (Corvic P65/50*), followed by the evaporation of 43 parts of methyl methacrylate monomer. The polyvinyl chloride particles form an organosol dispersion in the methyl methacrylate monomer. The dispersion is cast and cured as in Example 1 to yield a glossy, flaw-free sheet containing 53.6% by volume of cristobalite and rutile in a matrix of polymethyl methacrylate and polyvinyl chloride. The product has similar mechanical properties and surface finish to that described in Example 21. In a burning test carried out as in Example 22, a sample burns very much more slowly than the product of Example 21.

*Corvic P65/50 is a Registered Trade Mark of Imperial Chemical Industries Limited for a spray-dried emulsion-polymerised polyvinyl chloride.

EXAMPLE 24

This Example illustrates the effect of cross-linking in accelerating the cure of the fluid composition and preventing boiling of monomer.

To 321g of the dispersion of Example 21 is added 24.2g of methyl methacrylate, 6.0 g of ethylene glycol dimethacrylate and 2.36 parts of Perkadox Y16. The dispersion is cast in a preheated flat plate mould in an oven at 80° C. After 6½ minutes, a solid, flaw-free casting is removed from the mould. The temperature inside the moulding reaches a maximum of 154° C. The mechanical properties of the product are as follows:

Flexural modulus, 13 GN m$^{-2}$; Flexural Strength, 128 MN m$^{-2}$; Impact strength, 4.3 KJ m$^{-2}$.

Repeating the above procedure but omitting the ethylene glycol dimethacrylate leads to the production of a bubbled and blown casting.

EXAMPLE 25

The procedure of Example 24 is repeated with a mould and oven temperature of 90° C. After only 4 minutes, a solid, flaw-free casting is removed from the mould; the peak temperature attained is 155° C.

EXAMPLE 26

This Example illustrates the "heat sink" effect of the inorganic particles in preventing monomer boiling during the curing operation.

The dispersion of Example 21 is adjusted by removal of some monomer so that after curing the volume proportion of cristobalite and rutile combined in the composite will be 60%. The dispersion is initiated with 2% of Perkadox Y16, based on the free methyl methacrylate present, and is cured at 80° C. as in Example 24. A solid cast sheet is removed from the mould after 10 minutes. In contrast, a sheet containing 50% by volume of filler cured under these conditions is badly flawed and blown.

EXAMPLES 27-30

This series of Examples illustrates the range of initiators that can be used for curing the fluid compositions and the absence of any large effect of initiator variation on the mechanical properties of the cured products.

Example 24 is repeated, but using the initiators and quantities shown below:

| | Initiator w/w on monomer | Temp. °C. | Cure time min. | Flex. mod., GN m$^{-2}$ | Flex. strength, MN m$^{-2}$ |
|---|---|---|---|---|---|
| Example 27 | 2% BP 2% DMPT | 23° C. | 30 mins. | 10.6 | 116 |
| Example 28 | 0.5% Y16 0.5% ADIB | 80° C. | 10 mins. | 10.16 | 109 |
| Example 29 | 0.5% IPP 0.5% DCP | 80° C. | 9 mins. | 10.56 | 114 |
| Example 30 | 0.1% IPP 0.9% BP | 80° C. | 13 mins. | 10.94 | 111 |

BP = Benzoyl peroxide
DMPT = Dimethyl paratoluidine
Y16 = "Perkadox" Y16 = bis(4-tert-butylcyclohexyl) peroxydicarbonate.
ADIB = 2,2-azo-bis-isobutyronitrile
IPP = Diisopropyl peroxydicarbonate
DCP = Dichloro benzoyl peroxide.

EXAMPLE 31

This Example illustrates the use of a rotational moulding procedure.

To 300 g of the ball-milled dispersion described in Example 21 is added a further 11.3 g of the dispersant described in Example 19, 5.5 g of ethylene glycol dimethacrylate, 8.7 g of methyl methacrylate, 1.6 parts of benzoyl peroxide and 1.6 parts of dimethyl paratoluidine. The Brookfield viscosity of the dispersion so obtained is 40 poise at 20 r.p.m. and 20° C. The dispersion is placed in a closed 1 pint polypropylene truncated cone tub mould (top diameter 12 cm, bottom diameter 11 cm, length 12 cm). The tub is rotated about the axis of symmetry at 7.0 r.p.m. and about the end-over-end axis at 16.5 r.p.m. at room temperature. After 30 minutes a flaw-free, thin-walled moulding which reproduces exactly the internal contours of the mould is obtained.

EXAMPLE 32

This Example illustrates the production of a fibre-modified composite material.

The curable composition used is the dispersion described in Example 21, of Brookfield viscosity 0.4 poise at 20 r.p.m. and 20° C., with initiator added and ready for casting so as to give a cured sheet with a 50% by volume content of cristobalite and rutile. This dispersion is pumped at very low pressure head (less than 10 p.s.i.), using a peristaltic pump, into the bottom of a vertically held 3/16" thick flat plate mould, which contains two layers of chopped strand glass fibre mat. (Supra E Mat* FPL436) and two layers of glass fibre surface veils. Pumping was continued until the dispersion issued from the top of the mould. The inlet and outlet were then clamped so as to seal the mould and the sample was cured in the mould for 2 hours at 50° C. followed by 2 hours at 80° C.

*Supra E Mat is a Registered Trade Mark of Fibre Glass Limited for a polymer latex-bound chopped glass fibre strand mat with approximately 200 fibres per strand; each fibre is approximately 10 microns in diameter.

The final cured sample was free from entrained air and flaws, and contained 56% by weight of cristobalite and rutile and 15.6% by weight of glass fibre strand. The mechanical properties were as follows:

Flexural modulus, 12.5 GN $m^{-2}$; Flexural strength, 95.0 MN $m^{-2}$; Impact strength, 27.0 KJ $m^{-2}$.

Comparative Example K

An attempt is made to inject the slurry described in Comparative Example I, which contains particles larger than 100 microns, into a glass fibre-filled mould under the conditions described in Example 32. The mould very quickly becomes blocked and no further slurry can be injected. A further attempt is made by reducing the concentration of silica in the slurry to 40% by volume, but the mould still becomes blocked.

EXAMPLE 33

381 Grams of the dispersion described in Example 24 (50% by volume of cristobalite and rutile in the cured product) is initiated with 2.5 g of benzoyl peroxide and 2.5 g of dimethyl para toluidine. The dispersion, having a Brookfield viscosity less than 5 poise at 20 r.p.m. and 20° C., was then placed in a tub mould as described in Example 31 which is lined with one layer of surface veil and one layer of continuous strand glass fibre mat (FPL455 ex. Fibreglass Limited; each strand contains about 20 fibres of 10 microns diameter). The closed mould is rotated at room temperature for 1 hour in the same way as described in Example 31. A fibre-reinforced, thin-walled moulding is obtained, with complete wetting out of the fibres and exact reproduction of the mould contours.

EXAMPLE 34

A sheet of clear orientated 1/32" thick cast poly methyl methacrylate (Perspex, ex I.C.I. Ltd) was placed against one face of a 3/16" thick cavity sheet mould. Two layers of chopped strand mat as described in Example 32 were placed in the mould, and the mould faces were then closed. The dispersion of Example 32 is pumped into the mould in the manner described in that Example. After curing for 10 minutes at room temperature and post-curing at 80° C., a high quality 3/16" thick moulding is produced which is composed of a glass fibre-reinforced composite according to the invention, bonded to the acrylic sheet. The mechanical properties are as follows:

|  | Acrylic Face in Tension | Acrylic Face in Comprsssion |
|---|---|---|
| Flexural Modulus, GN $m^{-2}$ | 6.5 | 6.3 |
| Flexural Strength, MN $m^{-2}$ | 115 | 109 |
| Impact Strength, KJ $m^{-2}$ | 22.5 | 24 |

EXAMPLE 35

The dispersion of Example 21 is modified by addition of further methyl methacrylate to yield a dispersion which after casting and curing as described in Example 1 gives a 3.3 mm thick sheet which contains 30% by volume of cristobalite and rutile. This sheet is heated to 180° C. in an air oven, and then clamped in place over a 10 cm-diameter hole, compressed air is applied to one side of the hole and a 9 cm high blister is blown without fracture of the composite occurring. The thickness at the apex of the blister is approximately 0.2 mm.

EXAMPLE 36

A 3.3 mm-thick sheet is cast from the dispersion described in Example 21, containing 50% by volume of cristobalite and rutile. The sheet is then heated to 180° C. and blow moulded as described in Example 35. A 6cm-high blister is formed without fracture of the material.

EXAMPLE 37

An unsaturated polyester resin, which contains a proportion of mono-carboxylic acid-terminated polymer chains capable of functioning as the polymer dispersant and is free from dicarboxylic acid-terminated chains which would act as flocculants, is prepared (using excess glycol) by condensing the following ingredients:

Isophthalic acid: 26 parts;
Maleic anhydride: 32 parts;
Propylene glycol: 42 parts;

toluene being present as a water-entraining solvent. Glycol loss is prevented by the use of a short Vigreux column. The reaction is continued until the acid value of the mixture drops to 10 mg KOH/g, when 11.5 parts of evolved water have been collected. To reduce the chance of the presence of a dicarboxylic acid-terminated chain still further, 3.8 parts of Cardura E* is added and the reaction mixture is held at about 230° C. until the acid value drops to about 1.0 mg KOH/g, when approximately one chain in every twenty is terminated with acid groups. The batch is cooled to below 80° C., applying vacuum to remove as much toluene as possible, and the reaction mixture is thinned to about 70% solids with styrene to give a viscosity in the region of 13 poise, a hydroxyl value around 25 mg KOH/g non-volatile resin and a polyester number average molecular weight of approximately 2,000–3,000. To this product is then added 0.02%, based on solid resin, of Topanol 354**.

*"Cardura" E is a Registered Trade Mark of Shell International for a glycidyl ester of a branched $C_9$-$C_{13}$ saturated fatty acid, with epoxide value typically of 245. **"Topanol" 354 is a Registered Trade Mark of Imperial Chemical Industries Limited for 2, 6-di-tert-butyl-4-methoxyphenol.

A 50% by volume silica dispersion in a 50% non-volatile-content solution of polyester in styrene is made by charging the following to a pug mixer and mixing for 2 hours:

| | |
|---|---|
| Finely divided silica ("Minusil" 30***) | 312 parts |
| 68% by weight solution of polyester in styrene made as described above | 89.3 parts |
| Styrene | 33.9 parts |
| γ-Methacryloxy propyl trimethoxy silane | 2.98 parts |
| 1% solution of hydroquinone in styrene | 1.0 part |

***"Minusil" 30 is a Registered Trade Mark of Pennsylvania Glass Sand Company Limited for dry-ground air-classified α-quartz silica having the following particle size distribution:
Particles of 10 microns or less 99.8 by number (52% by weight)
Particles of 50 microns or less (86% by weight)
Particles of 100 microns or less (100% by weight)

A low-viscosity, deflocculated dispersion containing 71% by weight silica is obtained, which is self-de-aerating and self-levelling. The dispersion is initiated with 1.5% of benzoyl peroxide based on the resin and styrene present. After casting in a glass plate mould and curing at 80° C. for 1 hour, a high quality plaque is obtained. Viscosities and mechanical properties are reported in Table IV.

EXAMPLE 38

The following ingredients are charged to a pug mixer and mixed for 2 hours:

| | |
|---|---|
| Minusil 30* | 312 parts |
| Solution of polyester in styrene (as described in Example 37) | 50 parts |
| Styrene | 65 parts |
| γ-methacryloxypropyl trimethoxy silane | 2.98 parts |
| 1% hydroquinone solution in styrene | 1.0 part |

*See reference in Example 37.

A very low viscosity, deflocculated dispersion containing 72% by weight of silica is produced and, on curing as described in Example 37, a high quality casting results. Viscosities and mechanical properties are listed in Table IV.

EXAMPLE 39

The procedure of Example 38 is repeated but omitting the silane derivative. A very low viscosity dispersion and a high quality casting are again produced. Viscosities and mechanical properties are shown in Table IV.

Comparative Examples L and M

The procedures of Examples 37 and 38 respectively are repeated using an isophthalic acid-based polyester of similar composition but having an acid value of 25 mgm KOH/g (non-volatile). The relatively high acid value of this polyester, which is typical of commercially available polyesters, indicates that it contains a substantial proportion of short dicarboxylic acid-terminated chains which act as flocculants rather than dispersants. In each case a dispersion is prepared containing 50% by volume of silica (Minusil 30). The considerably higher viscosities of the dispersions obtained, as shown in Table IV, demonstrate clearly that the dispersions are flocculated.

Comparative Examples N–Q

These Examples illustrate the compositions described in Examples 37–39 and Comparative Example M when the silica filler is omitted; the curing conditions used are those described in Example 37. Viscosity data and other results are shown in Table IV.

TABLE IV

| | Composition Details | Brookfield Viscosity 2rpm 20° C. | Mechanical Properties | | |
|---|---|---|---|---|---|
| | | | Flex Mod, $GNm^{-2}$ | Flex Strength, $MNm^{-2}$ | Impact Strength, $KJm^{-2}$ |
| Example 37 | 50% low AV Polyester in styrene: 50% vol. silica + silane | 50 poise | 11.9 | 113 | 4.7 |
| Comparative Example N | 50% low AV Polyester + styrene: No silica | 0.9 poise | 2.5 | 90 | Not tested |
| Comparative Example L | 50% high AV Polyester in styrene: 50% vol. silica + silane | 750 poise | — | not tested | — |
| Comparative Example O | 50% high AV Polyester + styrene: No silica | 0.6 poise | — | not tested | — |
| Example 38 | 30% low AV Polyester in styrene: 50% vol. silica + silane. | 12.7 poise | 12.5 | 101 | 4.2 |
| Example 39 | 30% low AV Polyester in styrene: 50% vol. silica | 6.5 poise | 12.2 | 29 | 2.0 |
| Comparative Example P | 30% low AV polyester in styrene: No silica | 0.12 poise | Did not fully cure (14% free styrene) | | |
| Comparative Example M | 30% high AV Polyester in styrene: 50% vol. silica | 700 poise | not tested | | |
| Comparative Example Q | 30% high AV Polyester in styrene: No silica | 0.1 poise | Did not fully cure (17% free styrene) | | |

From the results in Table IV it is clear that the low acid value polyester, having a low probability of containing di-functional acid species, gives rise to dispersions of much lower viscosity than does the high acid value polyester. On curing, the fluid compositions of Examples 37, 38 and 39 yield composites stronger than the matrix polymer. This effect is most apparent with the 30%-non-volatile polyester compositions, for the unfilled 30%-NV polyester does not even cure to an homogenous solid.

EXAMPLE 40

This Example and Examples 41-42 illustrate the use of a matrix polymer which is derived from methyl methacrylate and the bis(methacrylic acid) adduct of an epoxy resin.

1640 parts of a finely divided β-crystobalite silica, having a surface area of 3 $m^2/g$ and a particle size distribution as follows:

particles of 5 microns or less—(40% by weight)
particles of 10 microns or less 99.9% by number (81% by weight)
particles of 50 microns or less—(100% by weight)

are dispersed in a mixture of 120 parts of methyl methacrylate and 480 parts of a 50% solution in methyl methacrylate of a bis(methacrylic acid) adduct of the epoxy resin known as "Epikote" 1004 (Registered Trade Mark), which is a condensation product of epichlorhydrin and diphenylolpropane having a molecular weight of about 1800, in the presence of 40 parts of a solution of a dispersant as described below. The dispersion is carried out using a high speed laboratory Torrance Cavitation Disperser, the silica being added gradually whilst the monomer/adduct mixture is stirred, the disperser finally being run at 1000 r.p.m. for 30 minutes to complete the operation. A fluid dispersion is obtained, the viscosity of which is measured by means of a Brookfield Viscometer, multispeed model RVF (Brookfield Engineering Laboratories Inc., Massechusetts, USA). In a portion of the dispersion is dissolved 2% by weight, based on the monomer/adduct content, of Perkadox Y16 initiator, the material is degassed under reduced pressure and is then moulded at 50° C. for 2 hours, and then at 80° C for 2 hours, into a sheet of composite material containing 54% by volume of silica. Physical and mechanical data for this Example are given in Table V. In this and the following Examples, viscosities are expressed in poise at 20° C. Where, in the case of shear-thickening or shear-thinning compositions, two viscosity values (a) and (b) are given, those marked (a) are measured at 2 r.p.m. using the Brookfield spindle size stated and those marked (b) are measured at 20 r.p.m., again using the spindle size stated. Where, in the case of essentially Newtonian compositions, only one viscosity value is given, this is the value measured at 2 r.p.m.

The bis(methacrylic acid) adduct of the epoxy resin used in the above procedure is made by heating under reflux at 135°-140° C. for 1½ hours the following ingredients:

| | |
|---|---|
| "Epikote" 1004 | 720 parts |
| Butyl acetate | 500 parts |
| Hydroquinone | 0.1 part |
| Dimethylaminoethanol | 2 parts |
| Methacrylic acid | 70 parts |

In this way, 90% of the epoxide groups present in the epoxy resin are converted to ester groups by the methacrylic acid, as indicated by acid value measurements. The solvent is removed under reduced pressure at 70° C. and the residue dissolved in methyl methacrylate to provide a 50% solution.

The dispersant solution used in the above procedure is made as follows. The above-described preparation of the epoxy resin adduct is followed, but with the quantity of methacrylic acid reduced to 50 parts. To the product, without removal of the solvent, is added 33 parts of p-nitrobenzoic acid and 1 part dimethylaminoethanol. The mixture is heated at 135°-140° C. under reflux for 2½ hours and then the solvent is removed at 70° C. under vacuum. The resulting dispersant is dissolved in methyl methacrylate to give a 50% solution.

Comparative Example R

The procedure of Example 40 is repeated, but omitting the solution of the dispersant. Viscosity measurements on the dispersion obtained show it to exhibit substantial shear-thickening. These data and properties of the cured composite material are given in Table V.

EXAMPLE 41

The procedure of Example 40 is repeated, but with the incorporation, just prior to the final stage of dispersing the silica at 1000 r.p.m. for 30 minutes, of γ-methacryloxy-propyl trimethoxysilane and water in the proportions of 4 parts and 1 part respectively to 2240 parts of the silica/monomer/adduct mixture. The physical and mechanical properties recorded are given in Table V.

TABLE V

| Example No. | Type of composition | Viscosity of fluid composition (a)* | (b)* | Modulus $GNm^{-2}$ | Flex. Strength $MNm^{-2}$ | Impact Strength $KJm^{-2}$ |
|---|---|---|---|---|---|---|
| 40 | Dispersant present | 25 | 129 | 12.0 | 88.5 | 4.0 |
| Comparative R | No Dispersant | 100 | 440 | 13.7 | 109 | 5.4 |
| 41 | Dispersant and interfacial bonding agent | 22 | 89 | 12.5 | 130.7 | 6.6 |

*(a) measured with Brookfield spindle No. 2
*(b) measured with Brookfield spindle No. 5 or 6

The results shown in Table V demonstrate the marked improvement in the fluidity of the curable composition which results from the use of the polymeric dispersant, and also the further improvement in fluidity achieved by incorporating an interfacial bonding agent during the process of dispersing the filler.

EXAMPLE 42

The procedure of Example 40 is repeated, but using as the starting materials 1640 parts of the finely divided silica, 120 parts of methyl methacrylate, 310 parts of the 50% solution of the epoxy resin adduct, 170 parts of a dispersant solution as described below, and 1 part of water. The dispersion obtained has viscosities of (a) 66 poise (spindle No. 3) and (b) 378 poise (spindle No. 6). The cured composite material, containing 54.0% by volume of silica, has modulus 15.1 $GNm^{-2}$, flexural strength 154 $MNm^{-2}$ and impact strength 7.9 $KJm^{-2}$.

The dispersant solution used in this procedure is obtained as follows. The procedure described in Example 40 for the preparation of the epoxy resin adduct used therein is followed, except that the amount of methacrylic acid is reduced to 50 parts. To the 50% solution of the adduct is added 35 parts of γ-aminopropyl trimethoxysilane and the mixture is allowed to stand overnight to complete the reaction of the residual epoxide groups of the adduct with the amino groups of the silane derivative.

EXAMPLE 43

This Example illustrates the use of a polymerisable system based on styrene and chlorophenylmaleimide.

312 parts of chlorophenylmaleimide are dissolved in 208 parts of styrene with slight warming, giving a 1:3 molar comonomer mixture. To this are added 26 parts of a 50% solution of a dispersant as described below, followed by 1410 parts of the finely divided silica described in Example 40. The silica is dispersed in the manner described in Example 40, there being added, just prior to the final stage of dispersion at 1000 r.p.m. 3.5 parts of γ-methacryloxypropyl trimethoxysilane and 0.7 part of water. A fluid dispersion is obtained (viscosity 9 poise) which can be cured as described in Example 40 to give a sheet of composite material containing 53.7% of silica by volume.

The dispersant solution used in this Example is obtained as follows. To a mixture of 0.85 part butanol, 2.0 part of glycidyl methacrylate and 17.8 parts of hydroxyisopropyl methacrylate, warmed to 30° C., there are added 2.55 parts of methacrylamide, together with a little water to assist dissolution. 13.2 Parts of styrene, 20.1 parts of 2-ethylhexyl acrylate and 0.5 part of tertiarybutyl perbenzoate are then added. 42.2 Parts of xylene are heated to reflux temperature (140° C.) and the foregoing monomer mixture is fed in over a period of 3 hours, with the addition of a further 0.1 part of tertiary-butyl perbenzoate after 1 hour. Heating at reflux temperature is continued until the mixture has a solids content of 49–51%. The mixture is then cooled to 110° C. and 0.6 part of p-amino-benzoic acid and 0.1 part of "Armeen" DMCD (Registered Trade Mark for dimethyl cocoamine) is added. Heating at reflux is resumed and continued until the mixture has an acid value below 0.5 mgKOH/g. The xylene is then removed by vacuum distillation and the residual solid polymer is dissolved in styrene to give a 50% solids solution.

Comparative Example S

The procedure of Example 43 is repeated, but omitting the dispersant solution. When only 32% by volume of the silica has been added, the dispersion has already become highly thixotropic and cannot be moulded.

EXAMPLE 44

This Example and Example 45 illustrate the use of a polymerisable system based on methyl methacrylate copolymerised with a reaction product of hydroxyethyl methacrylate and a melamine-formaldehyde resin.

A mixture of 180 parts of paraformaldehyde, 126 parts of melamine, 185 parts of n-butanol and 200 parts of water is adjusted to pH 9.0 using N/2 sodium hydroxide solution, and is then heated under reflux for 30 minutes. To this mixture is added 780 parts of hydroxyethyl methacrylate (this contains sufficient free methacrylic acid to lower the pH of the mixture to 4.5), 0.5 part of hydroquinone and 200 parts of toluene. The mixture is heated and water removed by distillation, using a Dean and Stark separator. During distillation over 3 hours the temperature of the mixture rises from 88° to 120° C. and 314 cc of aqueous distillate are removed. The product is filtered, giving a low viscosity syrup. A dispersion is then prepared, by the method described in Example 40, from 1210 parts of the finely divided silica described in Example 40, 125 parts of the above-described syrup, 375 parts of methyl methacrylate and 20 parts of the methyl methacrylate-dimethylaminoethyl methacrylate copolymer dispersant described in Example 18. A highly fluid dispersion is obtained; the properties of the dispersion and of a composite material, containing 48.0% by volume of silica, produced therefrom by curing are given in Table VI.

EXAMPLE 45

The procedure of Example 44 is repeated, but with the addition, just prior to the final stage of dispersion at 1000 r.p.m. for 30 minutes of 5 parts of γ-methacryloxypropyl trimethoxysilane and 1.25 parts of water. The properties of the dispersion obtained and of the composite material produced therefrom are given in Table VI.

Comparative Example T

The procedure of Example 44 is repeated, but omitting the copolymer dispersant. The dispersion repidly becomes thixotropic during the addition of the silica and only 46.6% by volume of silica can be incorporated. The properties of the dispersion and the derived composite are shown in Table VI.

TABLE VI

| Example No. | Type of composition | Viscosity of fluid composition poise | Properties of composite | | |
|---|---|---|---|---|---|
| | | | Modulus $GNm^{-2}$ | Flex. strength $MNm^{-2}$ | Impact strength $KJm^{-2}$ |
| 44 | Dispersant present | 0.85 | 12.23 | 81.9 | 3.21 |
| 45 | Dispersant + interfacial bonding agent | 0.74 | 11.81 | 119 | 5.55 |
| Comparative T | No dispersant or bonding agent | 6.5 | 11.48 | 66.9 | 3.14 |

Here again the results show the progressive improvement in the fluidity of the curable composition, and in the properties of the derived composite material, resulting from the incorporation of the polymeric dispersant and further of the interfacial bonding agent.

EXAMPLE 46

This Example illustrates the use, as the basis for the polymer matrix, of a copolymer of methyl methacrylate and a vinylidene-terminated urethane prepolymer.

A prepolymer is prepared by dissolving 400 parts of "Desmodur" N (Registered Trade Mark for a trifunctional isocyanate) in 686 parts by volume of methyl methacrylate, together with 0.1 part of hydroquinone and 1.0 part of dibutyltin dilaurate. 286 Parts of hydroxyethyl methacrylate are added slowly over 45 minutes, and the mixture allowed to stand for a further 90 minutes (during which time the temperature rises to about 50°).

A dispersion is then prepared, by the method described in Example 40, from 1340 parts of the finely divided silica described in Example 40, 220 parts of the above-described prepolymer, 220 parts of methyl methacrylate, 60 parts of a dispersant solution as described below and 1.2 parts of water. The dispersion is highly fluid, with a viscosity of 2.0 poise only, and is easily fabricated into a composite material containing 53.3% by volume of silica and having the following excellent mechanical properties: Modulus, 12.04 GNm$^{-2}$; flexural strength, 129.6 MNm$^{-2}$; impact strength, 6.75 KJm$^{-2}$.

The solution of dispersing agent used in this procedure is obtained by dissolving 480 parts of "Desmodur" N in 806 parts of methyl methacrylate, together with 0.1 part of hydroquinone and 1.0 part of dibutyltin dilaurate, then adding 260 parts of hydroxyethyl methacrylate over a period of 45 minutes and allowing the mixture to stand for a further 1½ hours; finally, 72 parts of γ-aminopropyl trimethoxysilane are mixed in and the mixture allowed to stand overnight.

Comparative Example U

The procedure of Example 46 is repeated, but omitting the solution of the dispersing agent and increasing the amounts of the prepolymer and the methyl methacrylate to 250 parts each. The dispersion which results is very viscous and cannot be moulded.

EXAMPLE 47

This Example illustrates the use of polymer matrix based on polystyrene, with the filler having been produced by comminution in the presence of a dispersant and an interfacial bonding agent.

1264 Parts of coarse β-crystobalite silica, 497 parts of styrene, 3.5 parts of γ-methacryloxypropyl trimethoxysilane, 1.0 part of water and 50 parts of a 25% solution in styrene of a dispersant copolymer as described below are ground in a ball mill according to the method described in Example 5. A dispersion is obtained which contains 50.0% by volume of silica and has a viscosity of only 0.6 poise.

The dispersant used in a 1:1 by weight block copolymer of cis-1:4-polyisoprene and poly(dimethylaminoethyl methacrylate) in which both polymer blocks have a molecular weight of 10,000.

Comparative Example V

The procedure of Example 47 is repeated, but omitting the dispersant solution and the silane derivative and increasing the amount of styrene taken to 540 parts. The dispersion obtained again contains 50.0% by volume of silica but it is viscous and markedly thixotropic.

EXAMPLE 48

This Example and Examples 49 and 50 illustrate the use of barium sulphate as the inorganic filler in a methyl methacrylate-based system.

1700 Parts of Blanc Fixe (a precipitated barium sulphate of surface area 3.3 m$^2$/g and an average particle size of 0.5–0.6 microns) are dispersed in 500 parts of methyl methacrylate and 20 parts of the copolymer dispersant described in Example 5, using the procedure described in Example 40. A very fluid dispersion is obtained (viscosity 2.5 poise), containing 43.6% by volume of Blanc Fixe.

EXAMPLE 49

The procedure of Example 48 is repeated, but replacing the copolymer dispersant there described by 18 parts of the copolymer dispersant described in Example 18 and increasing the amount of Blanc Fixe to 2330 parts. The dispersion obtained contains 50% by volume of the filler and has viscosities of (a) 33 poise (spindle No. 4) and (b) 140 poise (spindle No. 7). A composite material obtained by curing the dispersion has modulus 12.04 GNm$^{-2}$; flexural strength 44.1 MNm$^{-2}$; impact strength 1.68 KJm$^{-2}$.

EXAMPLE 50

The procedure of Example 49 is repeated, but with the addition of 5 parts of methacrylic acid after the Blanc Fixe is fully incorporated. On making this addition, an immediate and substantial increase in fluidity of the dispersion becomes apparent. The dispersion has a viscosity of only 1.0 poise and a composite material obtained from it by curing has modulus 8.98 GNm$^{-2}$; flexural strength, 48.9 MNm$^{-2}$; impact strength, 1.93 KJm$^{-2}$. The improved fluidity of the dispersion may be attributable to conversion of the tertiary amine anchor groups in the dispersant copolymer to the corresponding methacrylic acid salt groups.

Comparative Example W

The procedure of Example 48 is repeated, but omitting the copolymer dispersant. After the addition to the methyl methacrylate of only 15% by volume of Blanc Fixe, the dispersion becomes so dilatant in character that further addition of filler is impossible.

EXAMPLE 51

In this Example and Example 52, the polymer matrix is derived from a styrene-divinylbenzene-butyl hydrogen maleate copolymer.

1300 Parts of the finely divided silica described in Example 40 are dispersed, using the method described in that Example, in 180 parts of styrene, 20 parts of divinyl benzene (as a 54% solution in ethylvinylbenzene), 340 parts of butyl hydrogen maleate and 9 parts of the copolymer dispersant of Example 18. The properties of the dispersion so obtained, containing 50% by volume of silica, and of a flaw-free, moulded sheet obtained by degassing and curing the dispersion, are shown in Table VII.

EXAMPLE 52

The procedure of Example 51 is repeated, with the addition of 5 parts of γ-methacryloxypropyl trimethoxysilane and 1 part of water to the mixture just prior to the final stage of dispersion at 1000 r.p.m. The properties of the dispersion so obtained again containing 50% by volume of silica, and of the derived cured composite material are shown in Table VII.

Comparative Example X

The procedure of Example 51 is repeated, but omitting the copolymer dispersant. When only approximately 42% by volume of silica has been incorporated, the dispersion is found to be extremely viscous and cannot be moulded.

TABLE VII

| Example No. | Type of composition | Viscosity of fluid composition poise | Properties of composite | | |
|---|---|---|---|---|---|
| | | | Modulus GNm$^{-2}$ | Flex Strength MNm$^{-2}$ | Impact Strength KJm$^{-2}$ |
| 51 | Dispersant present | 10 | 4.0 | 16.8 | 1.7 |
| 52 | Dispersant + interfa- | | | | |

TABLE VII-continued

| Example No. | Type of composition | Viscosity of fluid composition poise | Properties of composite | | |
|---|---|---|---|---|---|
| | | | Modulus GNm$^{-2}$ | Flex Strength MNm$^{-2}$ | Impact Strength KJm$^{-2}$ |
| | cial bonding agent | 10 | 2.0 | 18.5 | 2.8 |

EXAMPLE 53

970 Parts of calcium carbonate whiting No. 16, having the following particle size distribution:
Particles greater than 20 microns—17% by weight;
Particles greater than 10 microns—30% by weight;
Particles greater than 5 microns—53% by weight;
Particles greater than 2 microns—72% by weight;
are dispersed in 300 parts of methyl methacrylate containing 17 parts of the copolymer dispersant described in Example 18, using the procedure described in Example 40. The resulting dispersion is fluid, having viscosities of (a) 124 poise (spindle No. 3) and (b) 31.5 poise (spindle No. 3). It can be degassed and moulded into a composite sheet without difficulty; the filler content is 55.4% by volume.

EXAMPLE 54

The procedure of Example 53 is repeated, with the addition of 5 parts of methacrylic acid after the calcium carbonate is fully incorporated. This results in an increase in fluidity of the dispersion, the viscosities being (a) 69 poise (spindle No. 3) and (b) 13 poise (spindle No. 3), and in easier degassing and moulding.

Comparative Example Y

The procedure of Example 53 is repeated, but omitting the copolymer dispersant. It is found possible to incorporate only about 40% by volume of the calcium carbonate, owing to the high viscosity attained by the dispersion.

EXAMPLE 55

1600 Parts of the finely divided silica described in Example 40 are dispersed, by the method described in that Example, in 500 parts of butyl acrylate, 0.5 part of polypropylene glycol dimethacrylate, 3.5 parts of γ-methacryloxypropyl trimethoxysilane, 0.7 part of water and 13 parts of 90/10 copolymer of butyl acrylate and dimethylaminoethyl methacrylate as dispersant. A dispersion of viscosity 0.7 poise, containing 57.7% by volume of silica, is obtained, which is easily degassed and moulded to form a sheet of composite material.

EXAMPLE 56

This Example illustrates the production according to the invention of a composite material in which the polymer matrix is formed by the ring-opening addition polymerisation of epoxide group-containing prepolymers.

40 Parts of "Epikote" 828 (Registered Trade Mark; a diepoxide formed by the reaction of diphenylolpropane with epichlorhydrin and marketed by Shell Chemical Co.) are mixed with 60 parts of Epoxide No. 8 (a mixture of glycidyl ethers of $C_{12-14}$ monohydric alcohols, marketed by Proctor and Gamble) and 5 parts of a dispersant as described below. 245 parts of β-Crystobalite sand are dispersed in this mixture using a Torrance Cavitation Disperser. The product is a fluid dispersion (viscosity 24 poise) containing 50% by volume of silica. 100 Parts of the dispersion are polymerised by the addition of 3 parts of diethylene tetramine, giving a rigid, tough composite material.

The dispersant used in this Example is prepared by reacting 100 parts of "Epikote" 828 with 10 parts of p-nitrobenzoic acid in the presence of 1 part of dimethylaminoethanol at 140°–150° C. for 30 minutes.

A similar dispersion, prepared by the above procedure but omitting the dispersant, is much more viscous and consequently is more difficult to fabricate into a satisfactory composite material.

What we claim is:

1. A shaped and cured multi-component composite comprising an organic polymer matrix and a particulate inorganic reinforcing phase dispersed therein and bonded thereto, said composite being obtained by shaping and curing a stable, fluid mouldable and curable fluid composition comprising (A) an organic liquid which is polymerisable to form a solid polymer and has a viscosity not greater than 50 poise at the temperature at which the composition is to be moulded, (B) finely divided particles of one or more inorganic fillers having a maximum size of 100 microns, at least 95% by number of the particles being of a size 10 microns or less, and the surface area of the particles being from 20 m$^2$/cc to 1 m$^2$/cc, the said particles constituting from 35 to 85% by volume of the total composition, and (C) a polymeric dispersant containing at least one component of molecular weight at least 500 which is solvated by the polymerisable organic liquid (A), and containing one or more groupings which are capable of associating with, and effecting anchoring to, the particles of the inorganic filler (B) whereby the filler particles are maintained in a state of stably deflocculated dispersion in the polymerisable liquid.

2. A composite according to claim 1 in the form of a sheet, said sheet being characterized by its high impact strength, abrasion resistance and flexural modulus.

3. A composite according to claim 1 characterized by good surface finish, abrasion resistance, ease of pigmentation and fire resistance, said composite being in the form of a shaped article selected from work surfaces, decorative wall tiles, cabinet furniture, occasional tables and sanitary ware.

4. A composite according to claim 1 made from a composition wherein the polymerisable organic liquid (A) is a liquid monomer or a liquid mixture of monomers which can be polymerised to form a solid polymer in which the repeat units in the polymer chain are linked through carbon-carbon bonds.

5. A composite according to claim 4 wherein the monomer or each monomer is an unsaturated monomer capable of undergoing addition polymerisation.

6. A composite according to claim 5 wherein the monomer or at least one of the monomers is methyl methacrylate.

7. A composite according to claim 5 wherein the polymerisable organic liquid (A) is methyl methacrylate and the polymeric dispersant (C) is a random copolymer of methyl methacrylate and methacrylic acid.

8. A composite according to claim 5 wherein the polymerisable organic liquid (A) is methyl methacrylate and the polymeric dispersant (C) is a random copolymer of methyl methacrylate and dimethylaminoethyl methacrylate.

9. A composite according to claim 1 wherein the polymerisable liquid has a viscosity not greater than 1 poise and wherein more than 99% by number of the particles of the inorganic filler (B) are of a size 10 microns or less.

10. A cured casting comprising a composite according to claim 1.

11. A laminate comprising a composite according to claim 1 bonded to an acrylic sheet.

* * * * *